US010890921B2

(12) United States Patent
Gillett

(10) Patent No.: US 10,890,921 B2
(45) Date of Patent: Jan. 12, 2021

(54) ROBOT AND DRONE ARRAY

(71) Applicant: Carla R Gillett, Sacramento, CA (US)

(72) Inventor: Carla R Gillett, Sacramento, CA (US)

(73) Assignee: Carla R. Gillett, Sacramento, CA (US)

( * ) Notice: Subject to any disclaimer, the term of this patent is extended or adjusted under 35 U.S.C. 154(b) by 257 days.

(21) Appl. No.: 15/993,609

(22) Filed: May 31, 2018

(65) Prior Publication Data
US 2019/0369641 A1 Dec. 5, 2019

(51) Int. Cl.
*G05D 1/00* (2006.01)
*G05D 1/02* (2020.01)
(Continued)

(52) U.S. Cl.
CPC ............. *G05D 1/0287* (2013.01); *A63F 9/24* (2013.01); *B25J 9/163* (2013.01); *B25J 9/1664* (2013.01);
(Continued)

(58) Field of Classification Search
CPC .. G05D 1/0212; G05D 1/0088; G05D 1/0257; G05D 1/0027; G05D 1/0238;
(Continued)

(56) References Cited

U.S. PATENT DOCUMENTS

| 2011/0139923 A1* | 6/2011 | Papanikolopoulos ........................ B64C 39/028 244/2 |
| 2017/0106738 A1 | 4/2017 | Gillett |
| 2018/0095467 A1* | 4/2018 | Perrone .................. B25J 9/1661 |

OTHER PUBLICATIONS

In/Assignee: Carla R. Gillett U.S. Appl. No. 15/331,820, filed Oct. 22, 2016 Publication No. US 20170106738 A1; Pub Date: Apr. 20, 2017 Confirmation No. 8584. Self Balancing Robot System Comprising Robotic Omniwheel.
(Continued)

*Primary Examiner* — Peter D Nolan
*Assistant Examiner* — Demetra R Smith-Stewart

(57) ABSTRACT

A mobile robot and drone device configured to dynamically allocate one or more task objectives and handling objectives, the mobile robot and drone device systematically couples to one another creating a hybrid robot-drone. The robot and drone array are utilized to work and obtain target objects in an environment, wherein the mobile robot and drone device comprise robotic arms and legs comprising propulsion drive wheels managed accordingly by AI system components including; an adaptive robot control system, an autonomous coupling system and an autonomous charging system configured with processors, and subsystems including; user interface, Cloud-Based Analysis and Data Usage Network, a sensor I/O devices including; LIDAR, RADAR, an altitude gyroscope sensors and cameras for scanning surrounding objects in an environment, and an identifier scanning system configured for identifying users, mobile robots, drone devices and target objects in a work environment and in a game environment. The work environment can include a consigned robot and drone array to work inside a cargo vehicle to gather cargo boxes and packages for delivery, and the array of working mobile robot and subsequently the drone device transports the boxes and packages by a flight plan and by a land-based drone device drive mode in flight restricted zones, and the game environment includes real-time gameplay, virtual reality and augmented E Sports game platforms.

10 Claims, 25 Drawing Sheets

(51) Int. Cl.
| | | |
|---|---|---|
| *G05D 1/10* | (2006.01) | |
| *B64C 25/10* | (2006.01) | |
| *B64C 25/36* | (2006.01) | |
| *B64C 27/08* | (2006.01) | |
| *B25J 9/16* | (2006.01) | |
| *A63F 9/24* | (2006.01) | |
| *B64F 1/22* | (2006.01) | |
| *B64C 39/02* | (2006.01) | |
| *B64C 37/00* | (2006.01) | |
| *B60L 53/80* | (2019.01) | |
| *H04W 84/12* | (2009.01) | |
| *B25J 19/00* | (2006.01) | |
| *H04W 4/80* | (2018.01) | |

(52) U.S. Cl.
CPC .............. *B60L 53/80* (2019.02); *B64C 37/00* (2013.01); *B64C 39/024* (2013.01); *B64F 1/22* (2013.01); *G05D 1/0027* (2013.01); *G05D 1/0088* (2013.01); *G05D 1/0212* (2013.01); *G05D 1/0238* (2013.01); *G05D 1/0257* (2013.01); *G05D 1/0278* (2013.01); *G05D 1/0285* (2013.01); *G05D 1/101* (2013.01); *A63F 2009/2483* (2013.01); *B25J 19/0025* (2013.01); *B64C 2201/06* (2013.01); *H04W 4/80* (2018.02); *H04W 84/12* (2013.01)

(58) Field of Classification Search
CPC .. G05D 1/0278; G05D 1/0287; G05D 1/0285; G05D 1/101
See application file for complete search history.

(56) References Cited

OTHER PUBLICATIONS

Attached: Letter of Examination Support.
Public PAIR: Notice of Allowance dated Nov. 7, 2019.

* cited by examiner

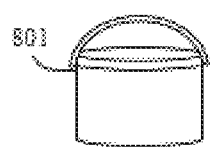
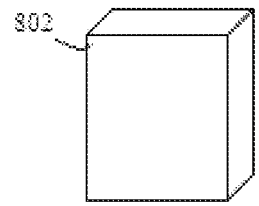
FIG. 8A  FIG. 8B
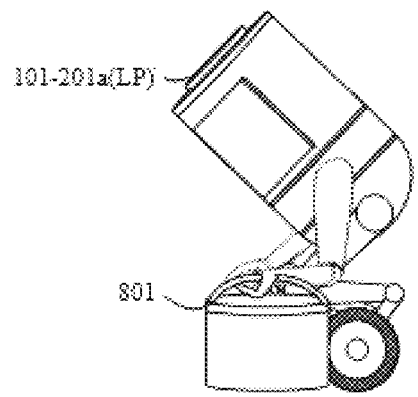
FIG. 8C

OBJECTIVE 1001

OBJECTIVE 1002

OBJECTIVE 1003

OBJECTIVE 1004

ROBOT AND DRONE ARRAY OBJECTIVE 1006

DRONE DEVICE FLIPPING SEQUENCE 1417-1420

AUTONOMOUS CHARGING SYSTEM 1800

1801. Execute operations by initiating, the measurement module 1812, a series of measurements of the electrical characteristics of the smart battery 204 over time;

↓

1802. Storing the series of laser points; taking every three x, y, z laser points 1812 as a group; and combining laser measuring values of the three: x, y, z laser points of the drone device 102;

↓

1803. Analyzing the series of measurements to determine a remaining battery life time value 204a of the smart battery 1811/204; and transmitting the remaining battery life time value 1813 from the communication interface 1814 to a receiver 1815.

↓

1804. Calculating distances among the laser points 1812 respectively and initiating, by processing logic 1816, a first electrical measurement 1817 of a battery at a first time, wherein the battery and the processing logic 1816 are included in a smart battery 204, the smart battery 204a "sensors,";

↓

1805. Judging whether to perform point set division on the laser points or not; dividing the dividable laser points to acquire grouped point sets;

↓

1806. Storing first electrical data representative 1818 of the first electrical measurement 1817 in a memory 205 included in the smart battery 204 chemistry 204c of the battery and a means for processing logic 1818 storing the battery chemistry data 204d in battery memory 405 linked to memory 1823 and storage;

↓

1807. Initiating, by processing logic 1816, a second electrical measurement 1819 of the smart battery 204 at a second time following the first time;

↓

1808. Storing second electrical data representative 1820 of the second electrical measurement 1819 in the memory 205 included within the smart battery 204;

↓

1809. Determining, with the processing logic of the smart battery 204, a battery life value 204a based at least in part on the first and second electrical data; and

↓

1810. Transmitting, with a communication interface of the smart battery 204, the battery life time value 204a to a receiver external to the smart battery and storing the series of measurements to the memory 205.

FIG. 18

ROBOT AND DRONE ARRAY

FIELD

The present disclosure relates to highly intelligent mobile robots, drone devices and a hybrid robot-drone array utilized as laborers for multiple professions and relates to adaptive robot control system and AI game systems for controlling the handling of task objectives in work environments and in multi-game environments, the claimed inventions may combine and thus relate to one or more of these technologies.

BACKGROUND

As the demand to employ highly intelligent robots and drones increases present day robots and drones have limited mobility to handle most job requirements for example, todays mobile robots can vacuum, mow lawns and repetitively work with one skill in factories and farms, and for gameplay robot competitors superfluously try to destroy one another and drones just fly about in racing matches. Advantageously what is needed are peer robots and drones providing improved tactile mobility and integrated handling skills to complete complex tasks when employed for targeting objects to clean, cook, gather, produce and maintenance, or to entertain users by playing physically automatic and virtually innovative mobile robot and drone game applications.

SUMMARY

Ideally what is essential for the advancement of autonomous mobile robot and drone technology is to provide highly intelligent and adaptive mobile robots and drone devices capable of collaborating as integrated hybrid robot drones to handle a plurality of task objectives. In various aspects the present mobile robots and drone devices comprise AI system components including; an adaptive robot control system (ARCS), an autonomous coupling system, an autonomous charging system, and complex subsystems configured to dynamically allocate tasks to obtain and manipulate one or more target objects such as; persons, places, and things, the places are multifaceted work environments relating to multiple professions and mixed-reality game applications such as; a Real-Time Game System comprising mobile robot players and drone device players, and hybrid robot-drone players, and more so, a Virtual Reality Game System and an Augmented Virtual Game System played with mobile robot avatars and drone device avatars, and hybrid robot-drone players avatars and game accessories.

BRIEF DESCRIPTION OF THE DRAWINGS

These and other aspects of the present invention will become apparent to those skilled in the art after a reading of the following description of the preferred embodiment when considered with the drawings, as they support the claimed invention.

FIG. 8A schematically illustrates a container 801 represented for a target object 106 in accordance with the present disclosure.

FIG. 8B schematically illustrate a target object represented as a box 802 in accordance with the present disclosure.

FIG. 8C schematically illustrate a handling objective 1000 in accordance with the present disclosure in accordance with the present disclosure.

FIG. 18 schematically illustrates a flow chart of the Autonomous Charging System 1800 of a drone battery 1811 charging process in accordance with an embodiment of the disclosure.

DETAILED DESCRIPTION OF THE DRAWINGS

Figure 1A:
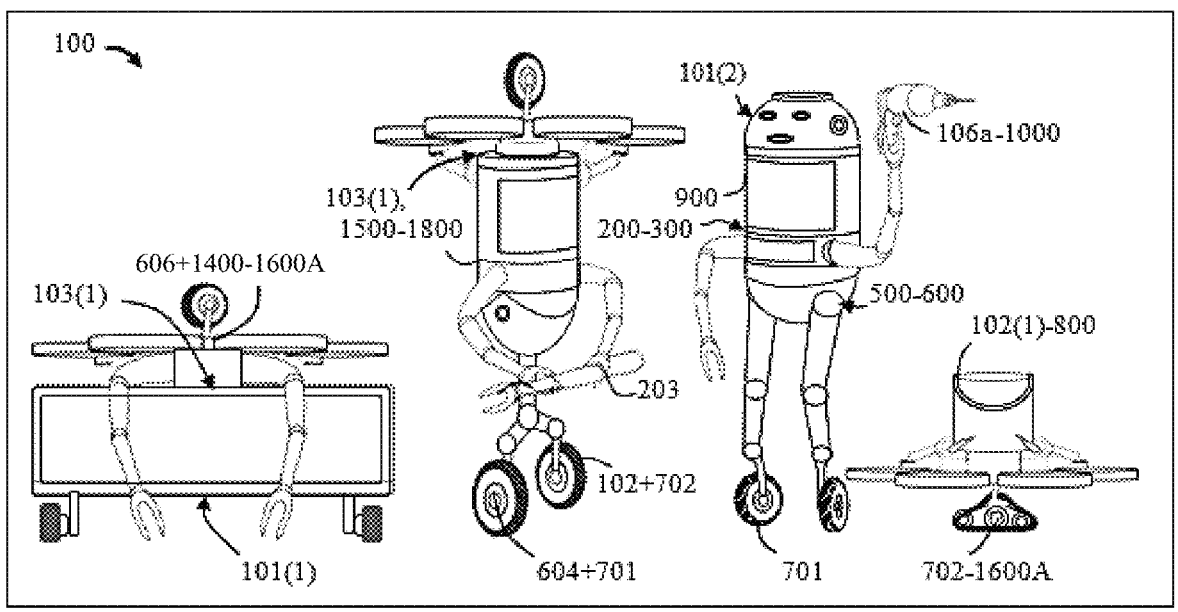
FIG. 1A schematically illustrates a robot and drone array 104 employment in a work environment in accordance with the present disclosure.

Hereinafter, the present invention discloses a robot and drone array 100 comprising diverse mobile robots 101, drone devices 102, and hybrid robot-drones 103 characterized as having a level of artificial intelligence to accomplish the handling objectives 1000 pertaining to complex tasks 104 and to interactively work for users 105. Fundamentally controlled elements of the robot and drone array 100 include an AI system 1500 schematically arranged for achieving the handling of target objects 105 for a variety of professions including; domestic, medical, rescue, environment restoration, delivery, food service production, policing, military, industry, gameplay and other tasks.

Figure 1B:
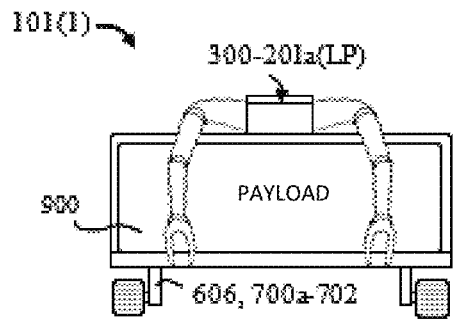
FIG. 1B schematically illustrates a first mobile robot 101 for employment applications in accordance with the present disclosure.
Figure 1C:
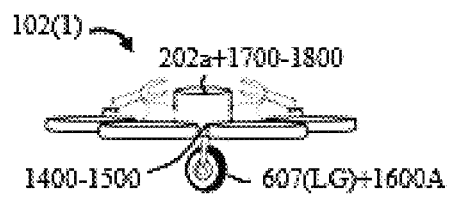
FIG. 1C schematically illustrates a first drone device 102(1) for employment applications in accordance with the present disclosure.
Figure 1D:
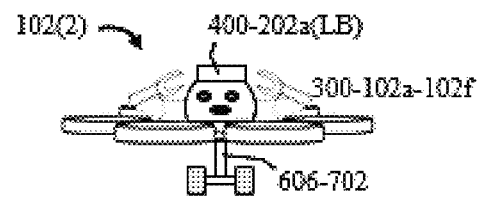
FIG. 1D illustrates a first hybrid robot-drone 103(1) for employment applications in accordance with the present disclosure.

In greater detail FIG. 1A illustrates the robot and drone array 100 comprising different mobile robot types for instance; a first mobile robot 101(1) depicted in FIG. 1B; and a second mobile robot 101(2) illustrated in FIG. 2A, as well as, comprising different drone types; a drone device 102(1) depicted in FIG. 1C; a drone device 102(2) illustrated in FIG. 2C, and a hybrid robot-drone 103 illustrated in FIG. 1D. Respectively, the robot and drone array's AI system 1500 data processor 1505 and processors 1516a-1516d for determining spatial locations of the one or more mobile robots 101 in an environment 107, and control positions and trajectories of objects in the environment 107, the objects are characterized as; a "person," or user 105, a "thing," a "payload," are referenced as a target object 106, and a "place," is referenced as a work environment 107a or a game environment 107b. Primarily environments and target objects involving robot types 101 and drone types 102 physically obtaining items like a box 106a, a tool 106b, a container 800, and an appliance 901-910 contained within a compartment 900. Respectively, each task objective 104 is based on criteria associated with tasks allocated for the mobile robots 101(1)-101(2), an aquatic robot 101(3), and a space robot 101(4), and criteria associated with tasks allocated for drone device 102(1)-102(2) and an aquatic drone 102(3) and criteria associated with tasks allocated for the hybrid robot-drone 103. In some contexts, the robot and drone array 100 may receive user input 105a from a communication network 1517 via a AI system 1500 systematically configured with an Adaptive Robot Control System (ARCS) 1600, an Autonomous Coupling System 1700, an Autonomous Charging System 1800, and subsystems disclosed herein.

In greater detail FIG. 1B illustrates first mobile robot 101(1) wherein the mobile robot comprising a body 201, the body configured with multiple sections configured with varied geometric shapes and dimensions; as depicted a compartment 900 is configured with an upper yoke apparatus 300 comprising a landing platform 202(LP), said landing platform 202 comprising one or more locking mechanisms configured for coupling via a latching sequence exampled in FIG. 17C. The landing platform providing a latching means 1700 for battery charging and for carrying a payload affixed thereon. The yoke apparatus further comprising one or more robotic arms having grippers or other tools; a section for a compartment 900, wherein the compartment for containing batteries, an appliance 901-910, and wired conduit; and a bottom section comprising a torso and a section comprising a truck 604, or truck 605 comprising a set of opposing drive wheels 700, said drive wheel components include a hub wheel arrangement 701 or a track wheel arrangement 702 proving drive propulsion.

Figure 12:
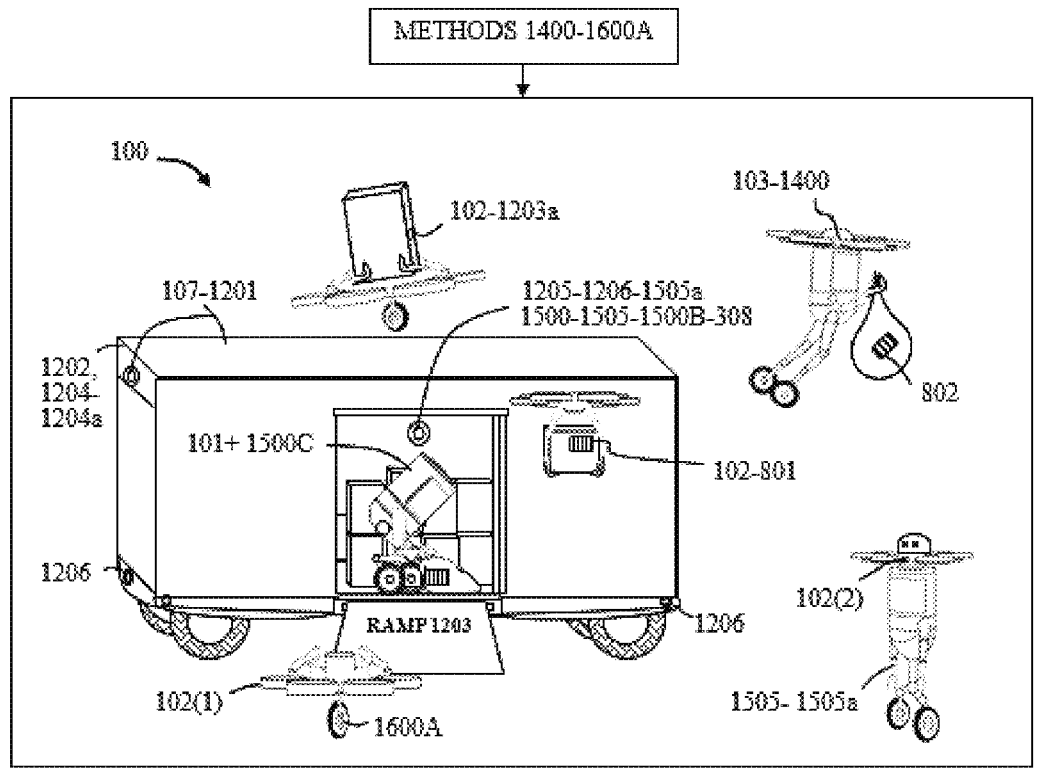
FIG. 12 schematically illustrates the task objective 1006 for the mobile robot 101 placing a portable container 801 on a drone device 102 in accordance with the present disclosure.
Figure 14A:
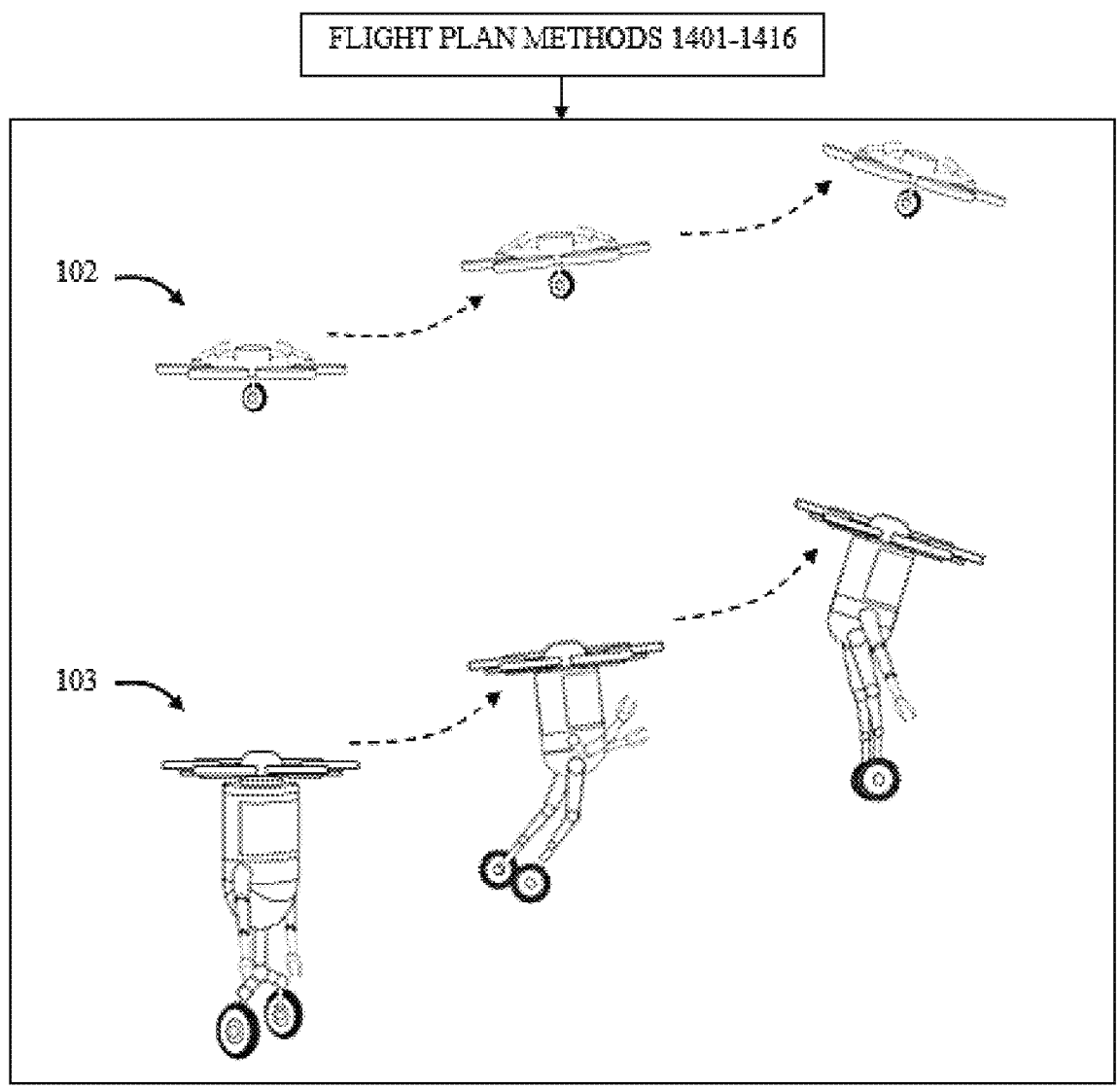
FIGS. 14A-14E schematically illustrate a flight control system 1400, flight plan 1401-1516 and drone flipping process 1417-1420 in accordance with the present disclosure.
Figure 14B:
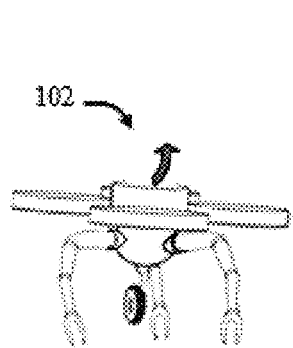

In greater detail FIG. 1C illustrates the first drone device 102(1) comprising a body 202(1), the drone body 202(1) configured with multiple component sections including; a fuselage 102a section configured with a built-in smartphone device 210 and flight hardware 102b-102d, a yoke apparatus 300 section comprising one or more robotic arms 303, and a landing gear 606 arrangement comprising a steerable propulsion drive wheel 701-702; a prewired conduit 201a-201b array linking a motor control subsystem 1500A and component sections to battery banks 1811; and comprising locking mechanisms configured for coupling to a mobile robot 101, exampled in FIG. 12, FIG. 14A, and FIG. 14B.

As shown in FIG. 1D, a drone device 102(2) is configure also with multiple component sections configured in drone device 102(1) however the yoke apparatus 300 section comprises an interactive head module 400, wherein the head module 400 comprises PC display 308, drone device camera 1514, and may comprise one or more compartments 900 containing an appliance 901, and a truck 606 providing propulsion.

Figure 1E:
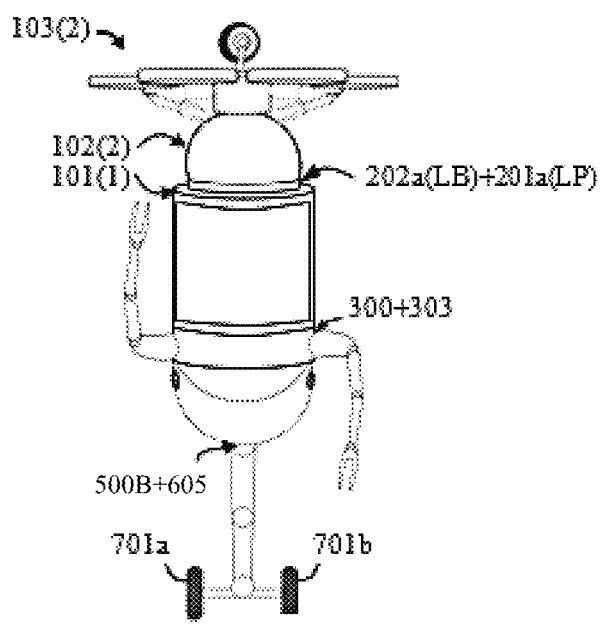
FIG. 1E schematically illustrates a second hybrid robot-drone 103(2) for employment in a work environment in accordance with the present disclosure.

In greater detail FIG. 1E illustrates a hybrid robot-drone 103(2) arrangement comprising a coupling process configured by an Autonomous Coupling System 1700, said Autonomous Coupling System 1700 is calibrated for integrating a drone device body 202 to a mobile robot body thus creating the hybrid robot-drone array 103. The hybrid robot-drone body 103(B) contains an array of conduit 201a-201d linking the upper and lower body sections together. The coupling process is calculated by trajectory algorithms calibrated self-adapting programming via ARCS 1600 for controlling the mobile robot 101 and the drone device 102 to couple and to separate. In various aspects, the hybrid robot-drone 103 comprises sensing system components 1501a-1501h and processor components 1516a-1615d, and a Flight Control System 1400 configured for transporting the hybrid robot-drone in aerial flight, as exampled in FIG. 14, the drone device flight plan processes 1401-1420 allowing the hybrid robot-drone 103 to fly and transport a payload, the payload accordingly being one or more target objects 105-106. In various aspects, the drone device 102 of the hybrid robot-drone 103 is configured to comprise large retractable rotors 102b calibrated for the handling the weight of the payload 105. Respectively the hybrid robot-drone 103 when actively engaged for takeoff is controlled by said fight control subsystem 1400 illustrated in FIG. 14A-14E exampling a drone device 102 is transporting an active or deactivated mobile robot 101.

Figure 2:
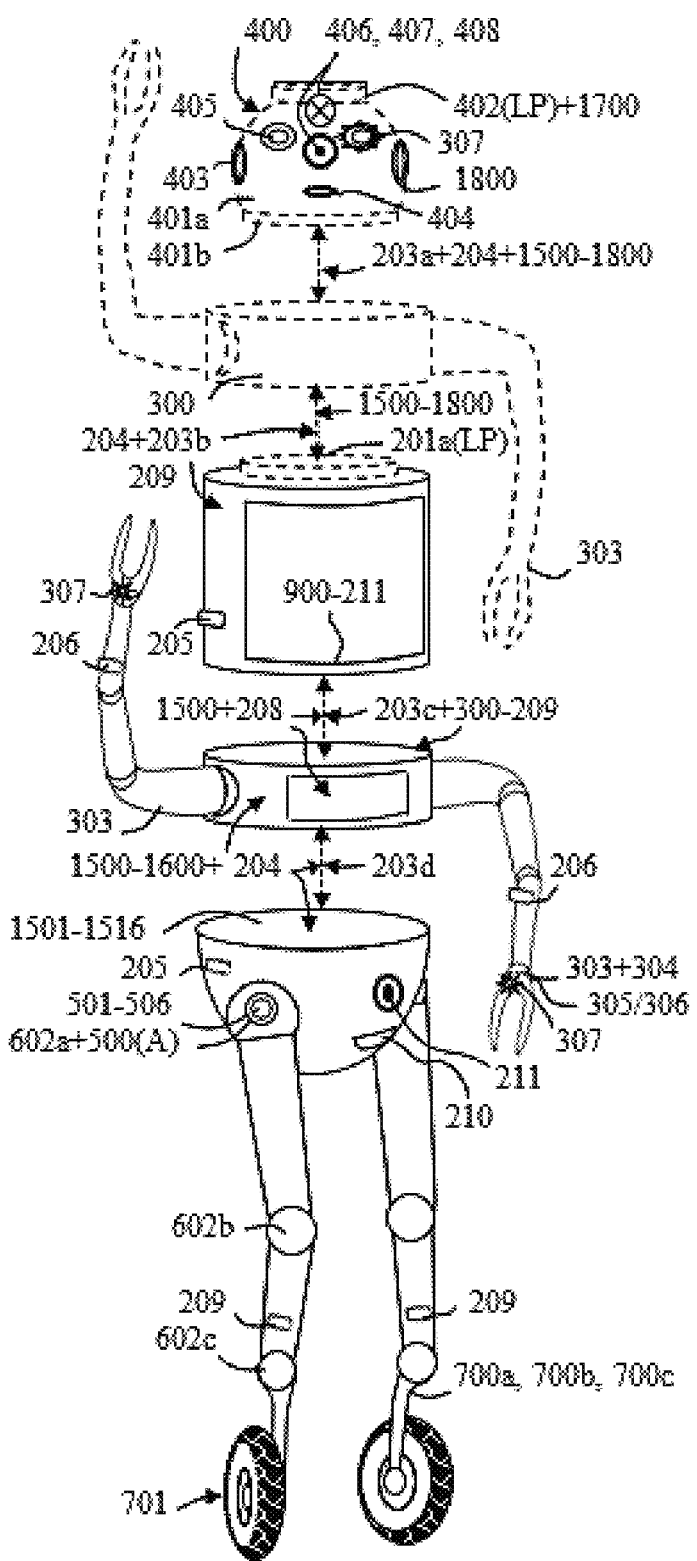
FIG. 2 schematically illustrates a second mobile robot 102(2) body 201 in accordance with the present disclosure.
Figure 3:
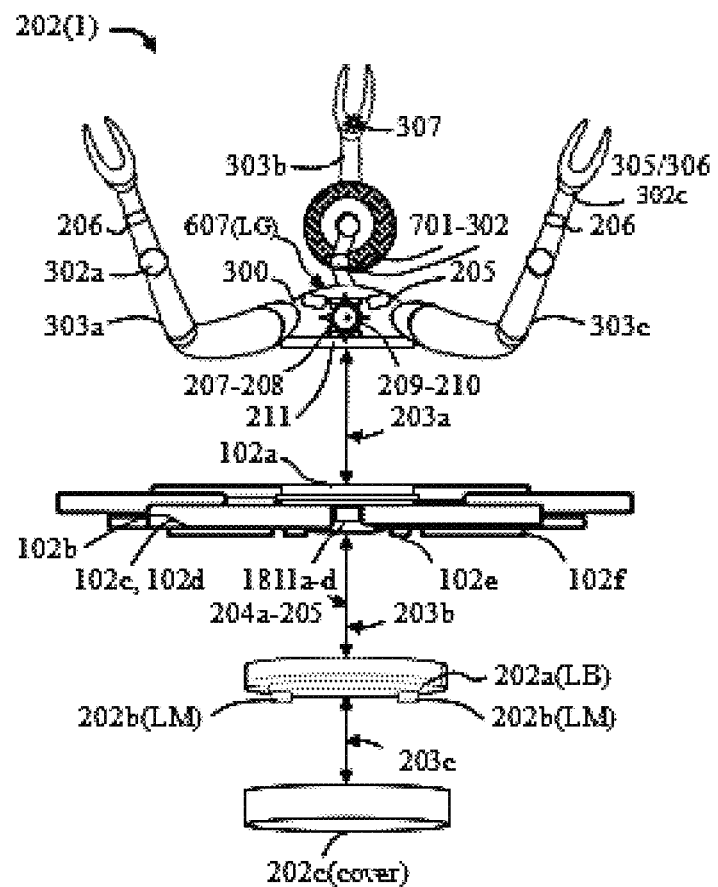
FIG. 3 schematically illustrates a first drone body 202(1) comprising landing gear 607 in accordance with the present disclosure.
Figure 4:
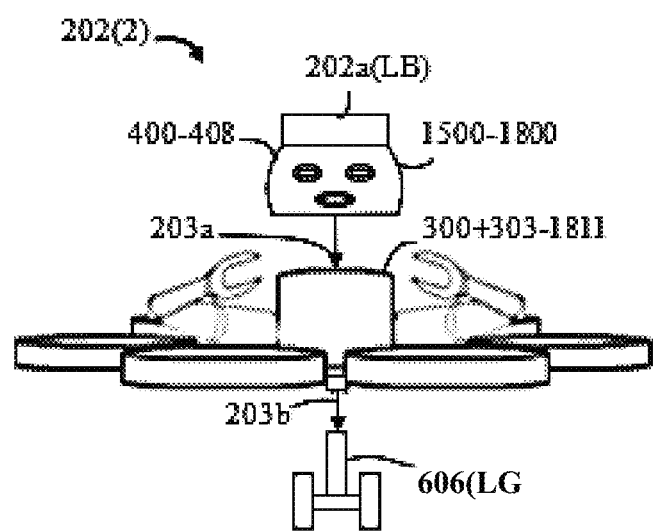
FIG. 4 schematically illustrates a second drone device 102(2) body 202 comprising an interactive head module in accordance with the present disclosure.

In greater detail FIG. 2 illustrates the second mobile robot body 201, and FIG. 3 and FIG. 4 illustrate the first drone body 202(1) and the second drone body 202(2) configured with multiple framework sections comprising: a landing platform 201a and locking mechanisms 201b, and conduit section 203a-203d containing: wiring, fasteners and other structural parts constructed with plastic, carbon fiber, metal, and combinations thereof, wherein the body 200 linking battery power to electric devices including: one or more processors comprising a level of artificially intelligent thinking modes via said AI system 1500, the AI system for determining dimensions of target objects and for dynamically transmitting calibrated a spatial location a target objects; a motor control subsystem 1500A for controlling variable speeds of one or more motors and actuators 202 and 203 contained within said mobile robot 101; said motor control subsystem 1500A for controlling variable speeds of one or more drive wheel motors 7010702 contained within said drive wheel devices, whereby, adapting a calibration the joint actuators and drive wheel motors accordingly to vertically adjust balance motion states; autonomous drive sensor devices including at least that of; environment tracking elements including; 3D camera 1514, and sensing system 1501 utilizing sensor devices; GPS environment mapping 1501a and LIDAR system 1501b, RADAR 1501c, and image sensors 1501d, optical sensors 1501e, position sensors 1501f, motion sensors like an altitude gyroscope sensor 1501g or IMU accelerator for detecting configurations of the work environment 107a for example; object characteristics of target objects and calculate positioning and movements of the target objects 106 situated in and on the framework 200 for a robot body 201(1) and 201(2). The robot body 201(1) and 201(2) further comprise a built-in smartphone 210, exampled on a section of a torso 500(A) including a set of robotic legs 600, or torso 500(A/B) including truck 604 or 605, the smartphone 210 comprising WIFI and Bluetooth connection, said built-in smartphone 210 is engaged for wirelessly controlling battery power levels from the mobile robot's motor control subsystem 1500A linking the battery power 204a directly to the mobile robot's electric motorized components.

Figure 9A:
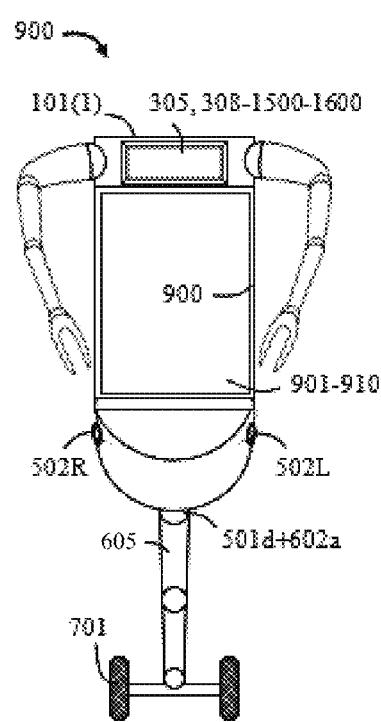
FIG. 9A schematically illustrates a first mobile robot 101(1) comprising a compartment 900 in accordance with the present disclosure.
Figure 9B:
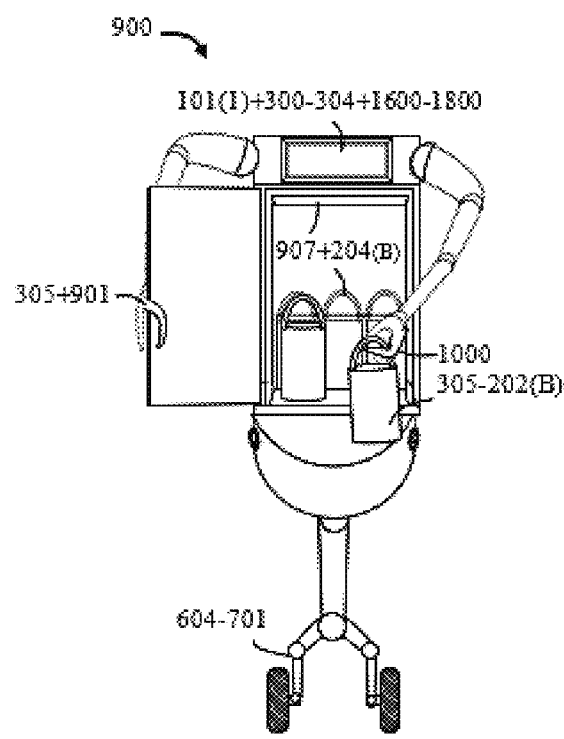
FIG. 9B schematically illustrates an appliance 901 for charging battery banks with accessible door for handling objective 1000 in accordance with the present disclosure.

Accordingly, the robot body 201 and torso 500 and compartment 900 comprises a battery 204 for housing one or more exchangeable smart batteries 1811 or battery banks 204(B) which can be configured with a handle for portability thus allowing the battery bank 204 to be removed or installed inside the compartment 900, detailed further in FIG. 9B.

In greater detail FIG. 3 illustrates a first drone body 202(1) comprising a yoke apparatus 300 configured with a coupling 203a process for connecting the yoke apparatus 300 to a drone fuselage 102a, one or more robotic arms 303a-303c comprising arm joints 302a-302d coupled to a gripper 305 or tool 306, the arm 303 is controlled by a motor controller subsystem 1500A calibrated for controlling arm joints 302a-302d, wherein said robotic arm 303 is configured to fold in a compact manner via joint actuators 302 during inflight maneuver to reduce air drag. The arms also containing a perimeter sensor 206a-206b and an identifier scanning sensor 307 for identifying target objects. Wherein the yoke apparatus and arms comprise USB electrical cabling 209 with plugs connectors connected battery power to said yoke components. The yoke apparatus compartment also contains a Bluetooth smartphone 210 and contains LED lights 211 to display a computer-generated light show linked to one or more speakers 102f, the LED lighting system 211 also utilized for turn signals and to light up the landing gear 606 when landing.

In various aspects, the drone device 102 is configured with a fuselage 102a, a yoke apparatus 300 landing base 202a comprising one or more locking mechanism 202b(LM) and 202b(LM), and a landing base encasement 202c for shielding locking mechanisms 202b(LM) and 202b(LM), said fuselage 102a containing a set of retractable rotors 102b including an actuator and motor controller 102c thereby providing thrust-yaw-pitch motions for inverted flipping actions, wherein the fuselage 201a comprises a battery compartment for housing an exchangeable smart battery 1811, said yoke apparatus 300 containing a landing gear 607, said landing gear 606 comprising an upward retracting leg joint 302 for landing purposes and to reduce air drag during flight operation. In one element said landing gear 607 comprising at least one drive wheel 700. Said drive wheel 700 is configured as a hub wheel 701 or a track wheel 702, the drive wheel 700 can be laterally folded by means of a joint actuator 302. In other aspects, the AI system 1500 providing I/O wireless control system devices including a built-in smartphone 210 having Bluetooth 210a, said built-in smartphone 210 wirelessly controlling power levels from the drone device's motor control subsystem 1500A linking the battery power 1811a directly to the drone's electric devices.

In further detail, FIG. 3 illustrates a yoke apparatus 300, accordingly in various embodiments the mobile robot 101 and drone device 102 include: a yoke apparatus 300 encompassing opposing left 303(L) and right arm 303(R), the yoke apparatus 300 comprising a coupling means for attaching one or more robotic arms 303 by means of a joint actuator 302a, the robotic the robotic arm 304, the robotic arm configured with multiple jointed arm segments 301a-301d situated in a perpendicular distance between multiple joint actuators 302a-302d controlled by actuator controller 304/1600A, wherein the user accesses the controls by a control panel 308 with touch screen monitor and gauge control components linking to the AI system 1500 via conduit sections containing electrical cable 310 and plugs connectors are constructively linked to a battery power 309 and connectively powering the one or more robotic arms 303, grippers 305, power tools 306 and arm scanner components 307 via flexible conduit which is coupled to the robot body via 203 coupling means. Respectively, the AI System 1500 controls the power furnished to the joint actuators 302, grippers 305 and power tool components 106 and arm scanner components 107. The AI System 1500 processor controls the battery power to the actuator controllers 304 of the robotic arm actuators 302 via an actuator controller 304/1500A is engaged to activate the motions of the gripper 305 to open and close. Respectively, the AI System 1500 and the electrical control subsystem 309 control gauges are contained within an interior compartment comprises a touch screen panel 308 including control system monitor and readout gauges. In various arm configurations, the lower arm segment 301d couples to a gripper device 305, and implement tools like a battery powered drill 106a, examples in FIG. 1D, and powered implements 106b, a pneumatic tool 106c, a hydraulic tool 106d, and mechanical equipment 106e the examples tool can include a motorized means of; an electric motor 106f, compressed air 106g, hydraulic 106h, or a combination thereof.

In further detail FIG. 4 further illustrates the head module 400, accordingly said head module 400 comprises a landing platform 401, a yoke apparatus comprising a landing platform, or a compartment comprising a landing platform 402; the head module is also comprising scanning elements; an identifier scanner sensor 307, LIDAR 404 and one or more cameras 405 situated on the front and rear sections on the head 400 and framework 401, the head framework comprises a base 401a, a landing platform 402 comprising locking mechanisms 402a for coupling a drone device thereon, and a microphone 403, speakers 404, cameras 405, LIDAR 406, an altitude gyroscope sensor 407, and LED lighting elements 211 and an intelligent user interface system via ARCS 1600 for automatically creating an interaction between a user, robot and drone; the intelligent User Interface Subsystem 1500B configured with a processor, a memory and a language menu input configured to handling a speaking representation in relating language linked to a wireless communication network 1517 comprising: an including an array input and output devices including of at least that of; WIFI, Bluetooth interface via a built-in Bluetooth smartphone device 210 configured with Bluetooth connected speakers 403 and microphone 404 linking to a Cloud-Based Analysis of Robotic System Control Component and Data Usage 1519. Wherein an AI system 1500 and the autonomous coupling system 1700 are configured for controlling components of a landing platform 401 for coupling a drone device thereon, the landing platform 401 comprising a battery charger receptacle for charging drone device smart battery 1811 is controlled by the autonomous charging system 1800. Wherein the head module 400 comprises a LED lighting system 211, the LED lighting system 211 configured with computer-generated LED lighting effects linked to one or more speakers and a microphone, LED lighting system 211 is provided for user 105a entertainment and gameplay interaction 1902. Wherein the head module comprising an Identifier Scanning Subsystem 1500C comprising: a scanner device 307, the scanner device is a component that can be situated on the front and rear section the head, respectively the identifier scanner sensor for identifying mobile robots and drone device by means of a processor map 407a and a user interface computing system to create a processor map using the identifier number (e.g., 101(1), 101(2), 102(1), 102(2), etc.) and displays the mobile robot identifier number and drone device identifier number to a user and the network with a control station 1520.

Figure 5A:
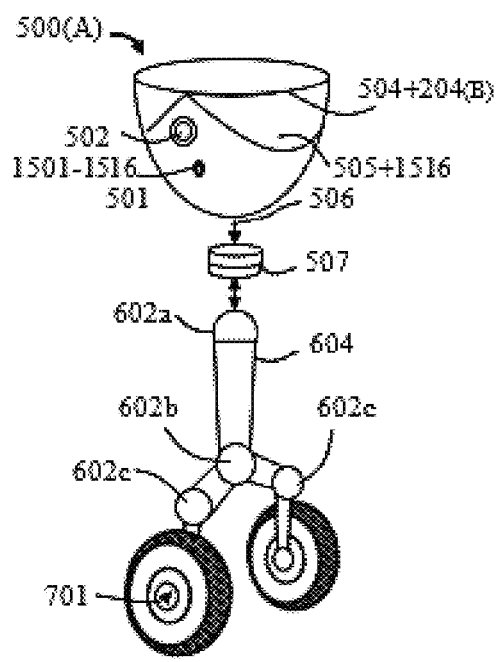
FIG. 5A schematically illustrates a jointed torso 500 in accordance with the present disclosure.
Figure 5B:
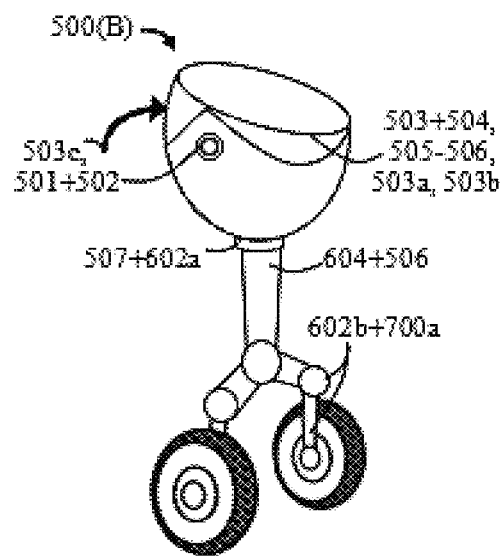
FIG. 5B illustrates a fulcrum torso 503 in accordance with the present disclosure.

In greater detail, FIG. 5A illustrates an example of the mobile robot's torso compartment, the torso 500 is configured with an outer housing compartment 501, a set of hip joint actuators 502, the torso compartment 500a comprising a set torso joint coupling 502a, 502b, and a set of robotic legs, and a battery bank 505 with a charger connectively coupled by a coupling means 203 via said motor control subsystem 1500A, arranged for supporting wherein, USB cable and wiring components 506 linked with a battery power 505. Accordingly, FIG. 5B illustrates torso 500(B) configured with an outer housing compartment 501 containing left and right actuators 502a, 502b for supporting an inner fulcrum container 503, wherein the pivoting fulcrum container contains right and left actuator motor controllers 503a/1500A, microprocessors 503b, a gyroscope sensor 503c for actively controlling an upright axis state of the robot body 201, and for controlling forward and backward pitch motions (depicted by a black arrow), when activated, to tilt the fulcrum container forwards and backwards, the torso arrangements providing both hip joint thereby the torso provides bending motions similar to waist bending of humans. In one aspect, a robotic leg joint actuator 602a the joint coupling 502(L) couples robotic leg 600(L) onto the left section of the torso compartment 500a, and the joint coupling 502(R) couples robotic leg 600(R) onto the right section of the torso compartment 500a; the torso compartment 500a comprises a torso base coupling 507 for attaching a robotic leg 604 and 606, the leg for pitch control; the robotic leg comprising a joint actuator for directly affixing to leg coupling situated on the bottom section of torso compartment, the robotic leg appendage 604 and 606 comprising truck arrangement containing electric drive wheels, the drive wheel comprising a motor, motor controllers, microprocessors, a IMU sensor 700f or gyroscope sensor type situated within the yoke module 700a of the drive wheel.

Figures 6A, 6B, 6C:
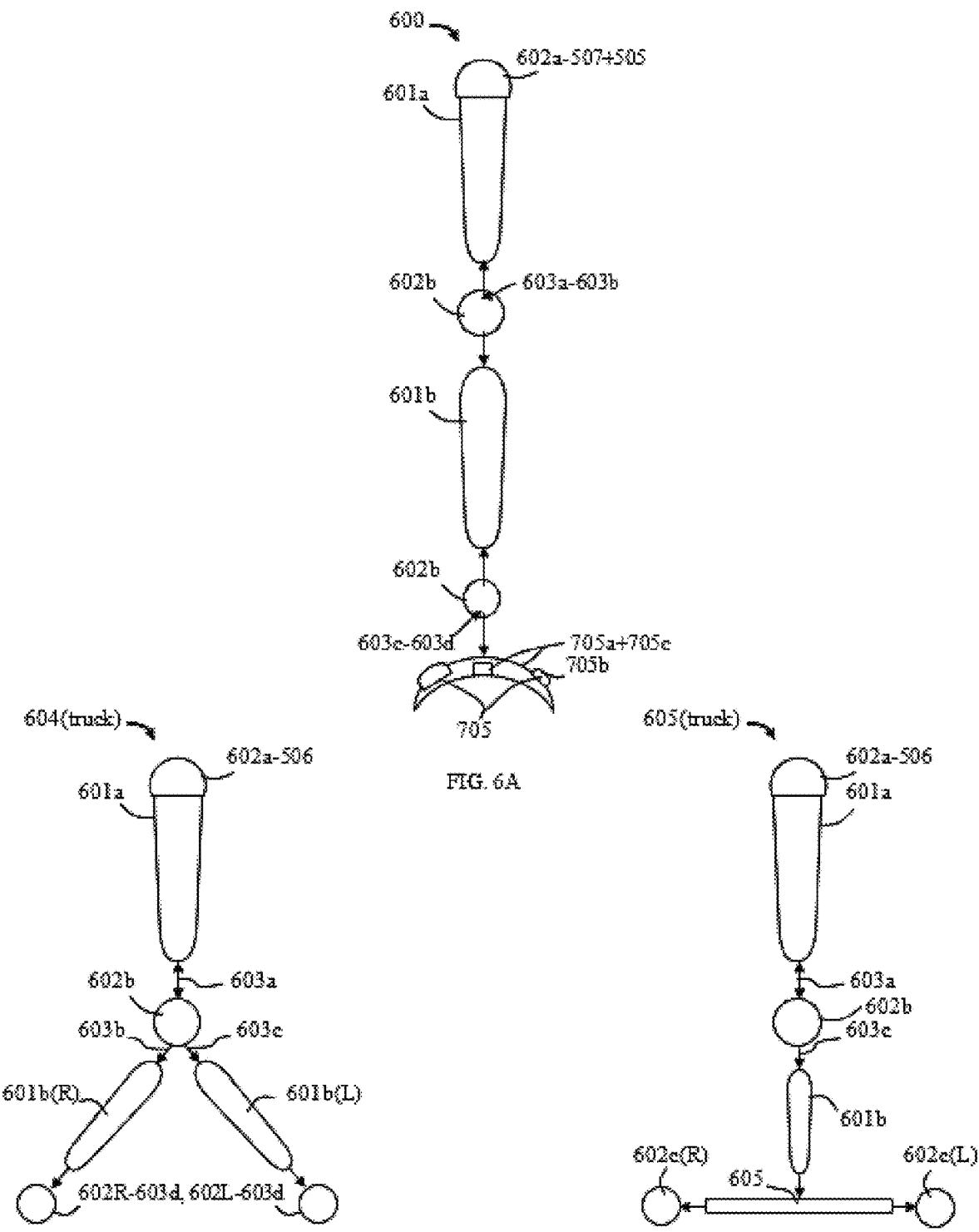
FIG. 6A schematically illustrates leg segments of robotic leg 600 and a fender 705 in accordance with the present disclosure.
FIG. 6B schematically illustrates multi-jointed leg segments of robotic leg arranged for a truck 604 in accordance with the present disclosure.
FIG. 6C schematically illustrates multi-jointed leg segments arranged for a truck 705 in accordance with the present disclosure.

In greater detail, FIG. 6A illustrates the robotic leg 600 comprises one or more perpendicular segments 601, the leg segment framework is made with plastic and carbon fiber or other substance, the multi jointed leg segments of robotic leg 600 for supporting a drive wheel 700 arrangement. The flexible robotic legs comprise perpendicular segments including a monoarticular ball-like actuator having undulating like joint motion thusly, moving the robotic leg in multiple pitch and yaw positions for providing biped motion states to transition up and down stairs and ramps.

In one embodiment, the leg segments 601a and 601b or more, are connected by joint actuators 602a and 602b, accordingly, the leg segment 601a works as a hip joint of the outer torso 501 when connected to joint actuator 602a, whereby the joint actuator 602a is rotably coupled to the torso coupling 502(C), examples in FIG. 2.

In one real-time task objective and handling objective providing undulating joint motion thusly, moving the robotic leg in multiple pitch and yaw positions. The leg joints 602 provides multi-position axis motion providing biped motion states and for shifting the pitch and yaw positions are ideally suited for climbing stairs in squatting positions and transitioning onto challenging curbs, sidewalks and ramps, examples in FIG. 14; FIG. 6B schematically illustrates multi jointed leg segments of robotic leg 604 supporting dual drive wheel assemblies 700m the multi jointed leg segments include; 601b(R), 601b(L), 602R-603d, 602L-603d. The leg segments of the robotic leg 600, as examples the robotic leg provides flexible knee like motion achieved by an undulating joint that is constructively configured with a monoarticular ball-like actuator device or "joint actuator 602," for providing undulating like joint motion thusly, moving the robotic leg in multiple pitch and yaw positions. The leg's actuator joint 602 provides multi-position axis motion providing biped motion states to maintain the balance the mobile robot and provide bending in vertical, lateral and horizontal positions; FIG. 6C schematically illustrates multi jointed leg segments of robotic leg 606 supporting a "truck" hub arrangement comprising a horizontal axle coupled to opposing a right drive wheel 700(R) and left drive wheel 700(L) assemblies, the truck containing hub assemblies include a set of hub wheels 701 or a track wheels 702, the truck exampled in FIG. 1C. Wherein the leg segment coupled to a fender 705, wherein the fender 705 is mounted module on the upper portion of the yoke module 700a, and the fender 705 comprises LED lights including head/brake lamps 705a and turning signals 705b, a fender proximity sensor 705c is prewired within via cable 700g.

Figure 7A:
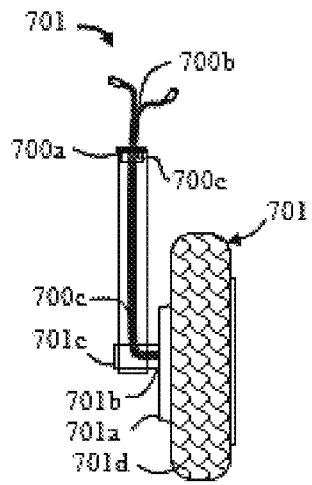
FIG. 7A schematically illustrates a front view of a hub wheel 701 in accordance with the present disclosure.
Figure 7B:
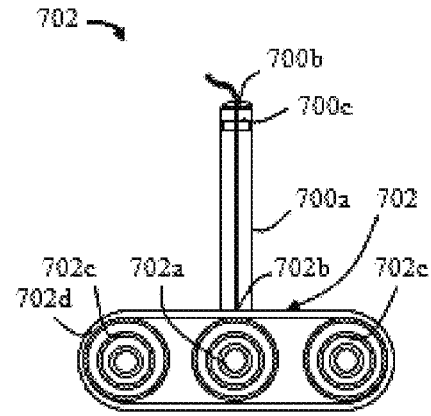
FIG. 7B schematically illustrates a side view of a track wheel 702 in accordance with the present disclosure.
Figure 7C:
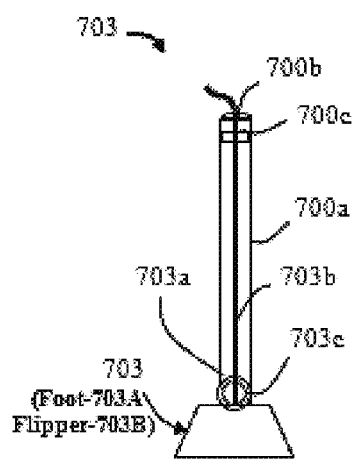
FIG. 7C schematically illustrates a front view of a foot or flipper 703 in accordance with the present disclosure.
Figure 7D:
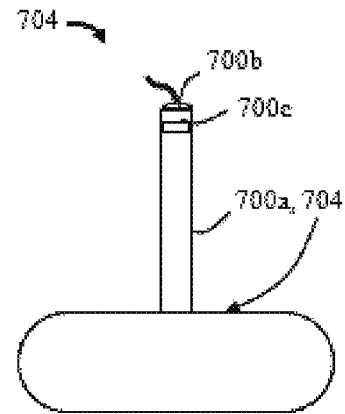
FIG. 7D schematically illustrates a side view of a floatation buoy 704 in accordance with the present disclosure.
Figure 7E:
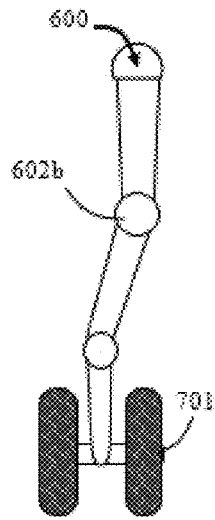
FIG. 7E, FIG. 7F and FIG. 7G schematically illustrate perspective front and side views of a robotic leg 600 comprising a hub wheel 701 in accordance with the present disclosure.
Figure 7G:
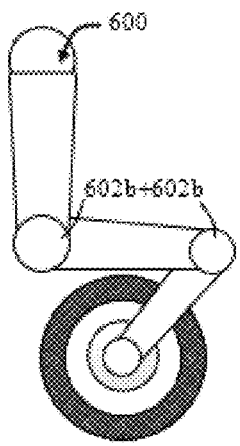
Figure 7I:
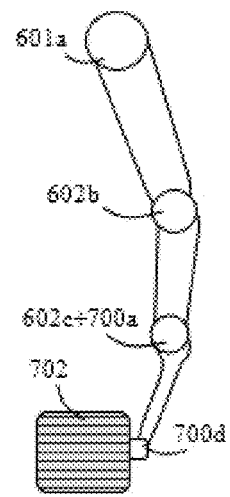
FIG. 7H, FIG. 7I and FIG. 7J schematically illustrate perspective front and side views of a jointed robotic leg with a track wheel 702 in accordance with the present disclosure.
Figure 7F:
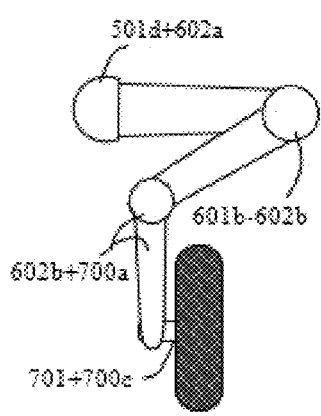
Figure 7H:
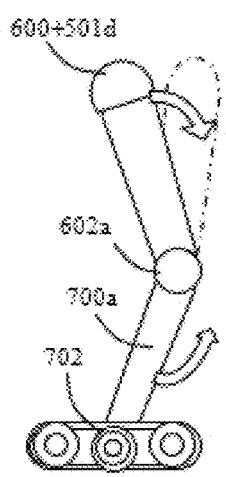
Figure 7J:
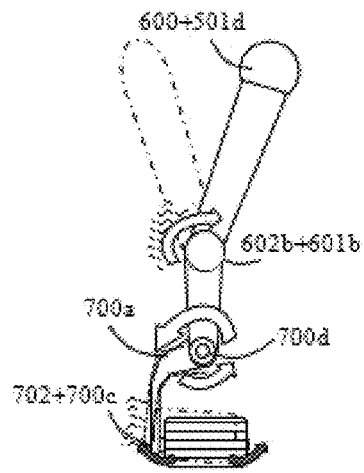

In greater detail, FIG. 7A through FIG. 7J illustrate the drive wheel 700 assemblies, respectively FIG. 7A depicts a the hub wheel assemblies including; a pre-wired yoke 604 for containing a drive motor, an axle, a tire, and hub assemblies configured with an electric hub motor a motor controller via the motor control subsystem 1500A, the drive motor with a braking means supported by at least one axle rod and at least one hub, the hub is configured to attach to a prewired yoke module 700a, the yoke module 700a is comprising a curved conduit shape with internal wiring connected to a controlled power source. The hub wheel device 701 is linked to an electric control system via power cable 700f, and the yoke module 700a supports a fender 705. As shown in FIG. 7B, the track wheel 702 in accordance with the present disclosure. The track wheel 702 comprises a pre-wired yoke 700a supporting a drive motor 700b, an axle 700c, a hub 700d, a track belt 700e, and a sensor and electrical wiring 700g, the track wheel's prewired yoke contains and supports the drive motor, an axle, a track belt, hub assemblies and a fender 705 the fender also containing LED lighting for head lamps and brake lights 705a. The jointed robotic leg 600 with a track wheel device 702 the robotic leg 600 is shown in a squatting position, and accordingly flexible leg positions can assist balance control. The track wheel device 702 comprising a drive motor 702a with braking means supported by at least one axle rod 702b and at least one hub 702c, the hub 702c is configured to attach to a prewired yoke module 700a, the yoke module 700a is comprising a vertical conduit shape containing a sensor device 702f for monitoring mechanical functions of the track wheel components controlled by means of via said motor control subsystem 1500A. In other aspects, FIG. 7C illustrates a shoe 703A or flipper 703B embodiment; FIG. 7D illustrates a buoy 704 embodiment, and the fender arrangement 705; accordingly, FIG. 7E, FIG. 7F, and FIG. 7G, schematically illustrate perspective front and side views of a jointed robotic leg with a hub wheel 702 arrangement; and FIG. 7H, FIG. 7I, FIG. 7J schematically illustrate perspective front and side views of a jointed robotic leg with a track wheel 702 having linear motion perpendicular to the axis of rotation and parallel or oblique angle with the gravity line.

In greater detail FIG. 8A, FIG. 8B and FIG. 8C illustrate the handling of a payload 800(A) represented as a container 801 with insulation with heating and cooling elements and a carrying handle; FIG. 8B and represent a box 802, or a package 803, wherein the container can be a temperature-controlled and comprise a DC battery prong plug, and payloads 801-802 comprise an insulated chest. The payload 800(A) are items of food stuffs and other delivery products, equipment, humans, animals and so forth. As FIG. 8C illustrates a handling objective 1000 a mobile robot 101 schematically obtaining a handle for transporting a portable container 801 and illustrated in FIG. 13 a mobile robot 101, a drone device 102, and a hybrid robot-drone schematically obtaining either a box 801 or a package 803 for handling objectives 1300. As FIG. 8C schematically illustrates compartment 901 for containing battery bank 204, wherein the batteries can be obtained by handling actions of a mobile robot 101.

In greater detail FIG. 9A illustrates a first mobile robot 101(1) configured with a compartment 900, wherein the compartment 900 exampled comprises one door, however the compartment may comprise one or more doors and drawers, the door and drawer may comprise a vendor viewing window, and a Bluetooth coded access lock. Wherein the compartment can contain or transport a person or thing. Respectively a compartment 900 to contain an appliance, the appliance type can include; a microwave for a cooking 901; a mini-oven for heating items for cooking 902; a mini refrigerator 903, a vending machine 904, a mini washing machine for cleaning and drying clothes 905, and a mini-lab 906 for scientific work 906, and other utility appliances. As FIG. 9B illustrates a first mobile robot 101(1) compartment can contain a battery charging appliance 910, the battery charging appliance is configured with the AI systems 1500-1800 for supporting the battery charging process. As exampled the mobile robot is obtaining a battery bank 204 from an array of charged batteries. Respectively, the compartment can contain equipment 911 like welding tools, air compressors, and so forth. In one aspect, the temperature-controlled cubicle can be contained within a compartment cavity thus working as a vending compartment; one or more doors and drawers having windows and coded access locks, and a means to access contained items. In one aspect, the cargo 903 being at least that of; delivery products 903a, equipment 903b, humans 903c and animals 903d.

Figure 10A:
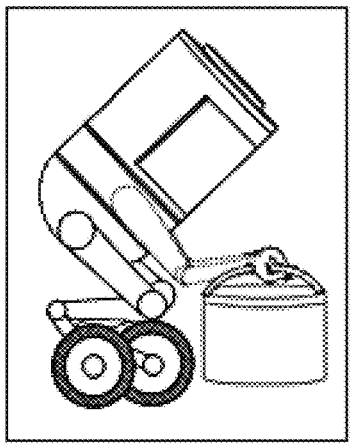
FIG. 10A schematically illustrates Objective 1001 for a mobile robot 101 picking up target objects; portable container 801, box 802 in accordance with the present disclosure.
Figure 10B:
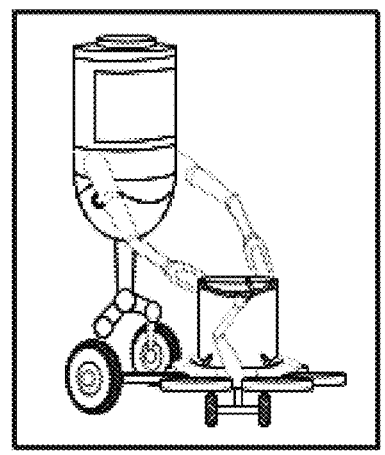
FIG. 10B schematically illustrates Objective 1002 for a mobile robot 101 placing a portable container or package onto a drone device 102 in accordance with the present disclosure.
Figure 10C:
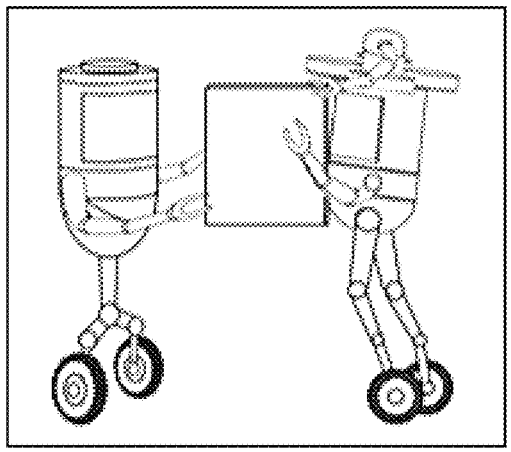
FIG. 10C schematically illustrates Objective 1003 for a mobile robot 101 handing a portable container or package to a peer mobile robot in accordance with the present disclosure.
Figure 10D:
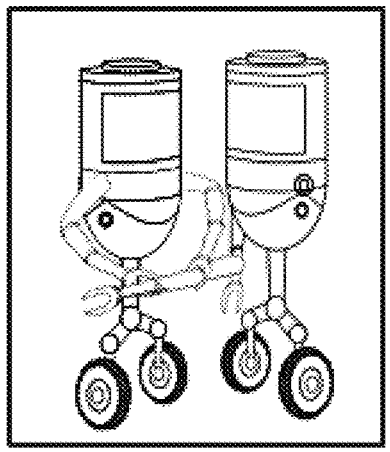
FIG. 10D schematically illustrates Objective 1004 for a mobile robot 101 exchanging an arm of a peer mobile robot 101(1) needing maintenance in accordance with the present disclosure.
Figure 11:
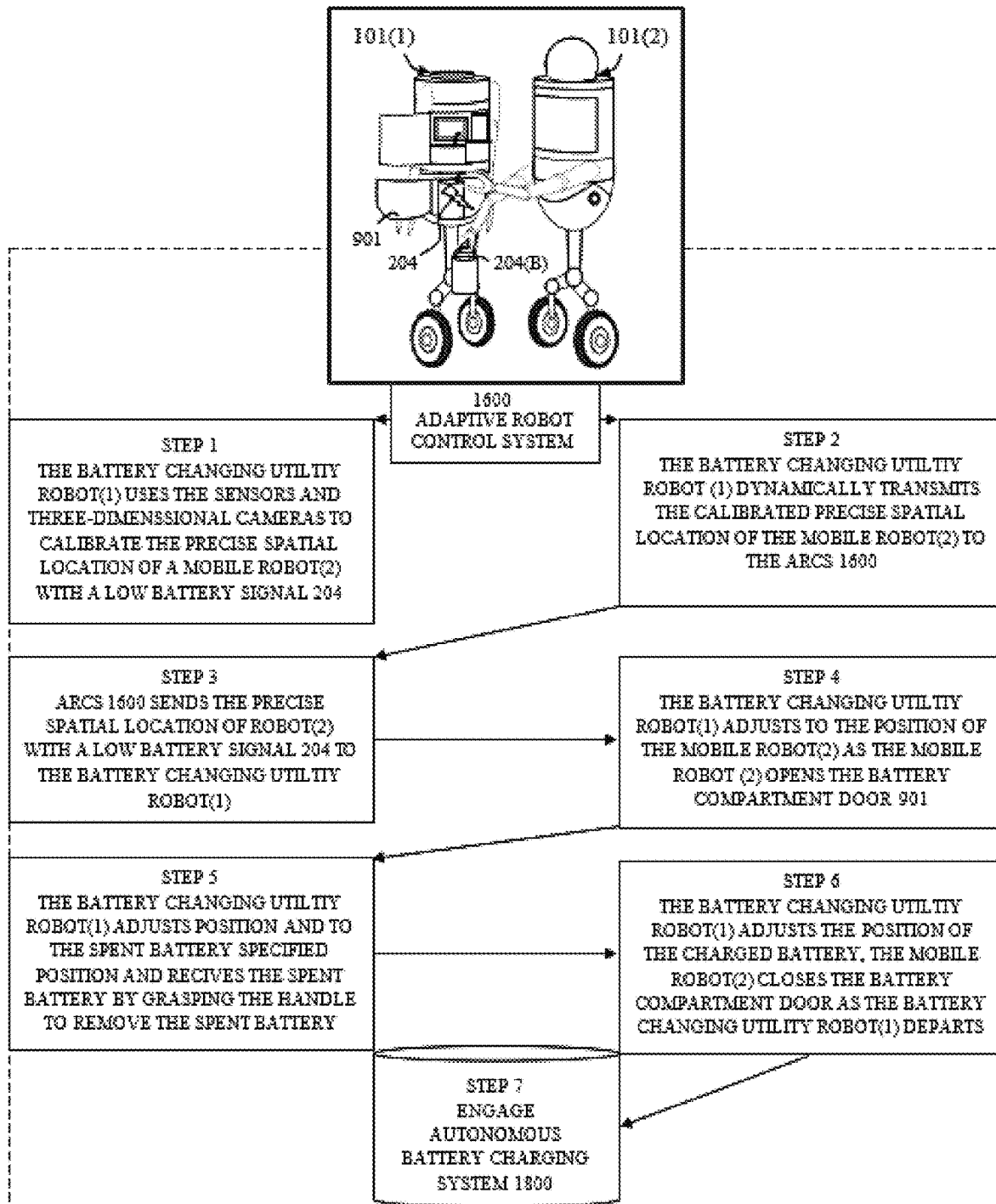
FIG. 11 schematically illustrates Objective 1005 for a first mobile robot (1) receiving assistance from a second mobile utility robot (2), the utility robot (2) exchanging an old spent battery with a new and fully-charged battery 204(B) in accordance with the present disclosure.

In greater detail, FIG. 10A illustrates Objective 1001 for a mobile robot 101 picking up target objects; portable container 801, box 802; FIG. 10B illustrates Objective 1002 for a mobile robot 101 placing a portable container or package onto a drone device 102; FIG. 10C illustrates Objective 1003 for a mobile robot 101 handing a portable container or package to a peer mobile robot; FIG. 10D illustrates Objective 1004 for a mobile robot 101 exchanging an arm of a peer mobile robot needing maintenance; and as illustrated in FIG. 11 Objective 1005 for a first mobile robot (1) receiving assistance from a second mobile utility robot (2), the utility robot (2) exchanging an old spent battery with a new and fully-charged battery 204(B).

Wherein the task objective comprises a processor procedure (exampled in FIG. 11 Step 1 through Step 7) of said mobile robot and said drone device to change a replaceable smart battery or lithium battery bank via pre-programmed trajectory algorithms configured to maneuver said battery bank by one or more robotic arms, wherein one or more of said trajectory algorithms include ARCS 1600 methodologies calibrated for controlling a handling a task to control said drone's robotic arm and to control a gripper to obtain a battery bank 204 from a compartment 800.

In greater detail FIG. 12 schematically illustrates Objective 1006 of a robot and drone array 104 unloading a cargo vehicle 1201 an example, in the drawing a drone device 102 and a mobile robot 101 to access a cargo cab 1202 containing a plurality of cargo boxes 801 and cargo packages 801, wherein said mobile robot 101 and drone device 102 enter said cargo cab 1202 by driving up a ramp 1203, wherein the mobile robot and drone device 102 utilize an identifier scanning device 307 via an Identifier Scanning Subsystem 1500C to scan a shipping bar code 800(BC) on the cargo boxes 801 and packages and 802. The cargo vehicle 1201 further comprises a video camera 1204 situated inside said cargo cab and outside said cargo vehicle, and a cargo inspection system 1205 utilizing an identifier scanning system 1500C, said cargo inspection system 1205 having an inspection processor 1206 configured to communicate to and from said drone devices 102 and said mobile robots 101 while working inside said cargo cab 1202. The cargo vehicle 1201 further comprises User Interface 1500B, wherein said user interface 1500B configured to communicate with said inspection processor 1206 via a AI system 1500; wherein said plurality of cargo packages 800 to be received and delivered by one or more of said mobile robots 101 and said drone devices 102; and wherein said mobile robot 101 configured to maneuver autonomously via a motor control subsystem 1500A based on input signals received from an AI system and a drive mode processor 1505 providing a level of artificial intelligent thinking modes for autonomous drivability, said drive mode processor 1505 comprising an input signal processor 1505a; wherein a data communication module 1503a receives multiple images dynamically captured by the mobile robot camera 405/3D cameras 1514, and drone device camera 1514 and the calibrated spatial location of the target object from, for example, the drone module 102 linked to a communication network 1517 of the AI system 1500 and wherein said drone device 101 configured to maneuver autonomously via a flight control subsystem 1600B and via a drone device drive mode subsystem 1600A. Accordingly the drone device 102 consigned for receiving and transporting said cargo 801-802 via said flight control subsystem 1600B and via said drone device drive's motor control subsystem 1600A. Accordingly the cargo vehicle 1201 being configured to send live visual images 1204a via camera 1204 to a user via a user interface 1500B via an electronic display device 1506-308; and said drive mode processor 1505 is further configured to transmit processor input signals 1505a received from said mobile robot 101 and said drone device 102; and wherein said drone device 102 and said mobile robot 101 are configured to send real-time video images 1204a to said user interface 1500B whilst working inside said cargo vehicle 1201 when said cargo vehicle 1201 is in a parked condition. The cargo vehicle further comprising sensing system 1501 components including: 1501a-1501g and LIDAR 206, environment scanner sensors 207, cameras 208, an IMU sensor 209 or gyroscope sensor type.

Figure 13:
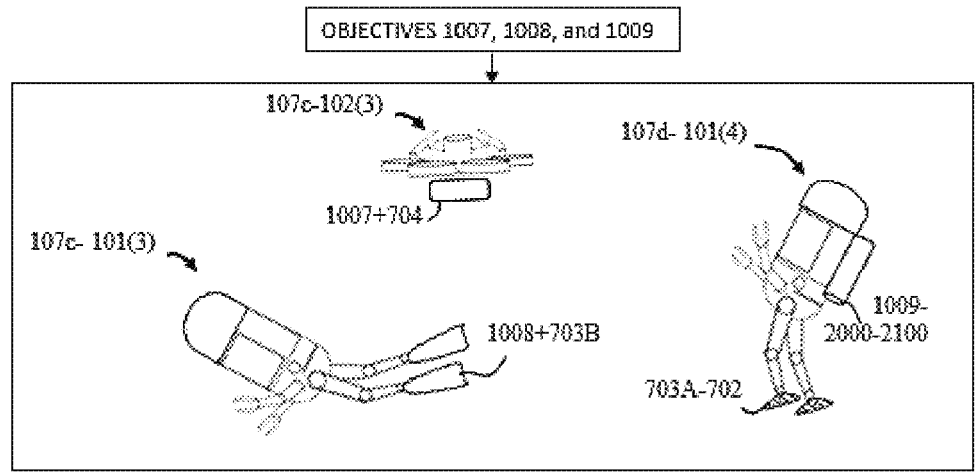
FIG. 13 schematically illustrates the task objective 1007, 1008, and 1009 in accordance with the present disclosure.

In greater detail FIG. 13 illustrates and outdoor work environment 107 for an aquatic mobile robot 101(3) for Objective 1306, said aquatic mobile robot 101(3) comprises a drive mode processor for autonomous drivability of said mobile robot to maneuver autonomously based on input signals received from an input signal processor 1505a and said AI system and said motor control subsystem 1500A, and an aquatic device 102(3) for Objective 1307, and a space robot 101(3) virtual avatar for game Objectives 2000-2100 consigned to work environments, as exampled, an aquatic environment 107c whereby a third drone device 102(3) is exampled in FIG. 13, a consigned third aquatic drone device 102(3) comprising a flotation buoy 704 instead of a drive wheel arrangement; FIG. 13 also depicts a consigned third aquatic robot 101(3) comprising a flipper 703(B), or a foot 703(A), and a space environment 107d, and FIG. 13 also depicts a consigned fourth space robot 101(4) comprising a footings 703(A) or track wheels 702.

In greater detail FIG. 14A illustrates a Flight Control Subsystem 1400 comprising a drone device flight plan 1401 of a hybrid robot-drone configured with flight plan methods 1401-1415, the methods comprising: a plurality of waypoints 1402, of said flight plan 1401; and a flight plan processor 1403 providing, for display to a user 104 and concurrent with the drone device 102 of the hybrid robot-drone 103 executing said flight plan 1401; a graphical interface 1404 including a representation of at least a portion of flight data 1405 from the Flight Control Subsystem 1400, wherein the representation includes a representation of the location of the hybrid robot-drone 103, a battery status 1406 of the hybrid robot-drone 103, a speed 1407 of the drone device's sensor data 1408 from the drone device's flight data 1405 includes; speed 1408, altitude 1409, location 1410, and sensor data 1408 for the modification of the flight plan 1401 may include adding or removing a waypoint 1402a and include altering a geographic location 1410 of a waypoint 1402b and modification to the flight plan 1401 including altering a flight profile 1401a between waypoints 1402a; wherein one or more processors 1403 having instructions stored thereon which, when executed by the at least one processor 1403, causes the one or more AI system processors 1516a-1516d to perform operations including: sending the Flight Control Subsystem 1400 for execution by the drone device 102 of the hybrid robot-drone 103, said flight plan 1401 adapted to a flight controller 1411 and for receiving flight data 1405; wherein said Flight Control Subsystem 1400 is calibrated for determining a modification based on the flight data 1405 received from the drone device 102 of the hybrid robot-drone 103, and then sending the modification to the flight profile 1402a execute the flight plan 1401 as modified by the modified agnostics 1412 to different types of the rotor controllers 102b via the motor control subsystem 1500A, whereby the Flight Control Subsystem 1400 to control the drone device's rotors 102b. Flight Plan Subsystem 1400 in one aspect, is operable via a built-in smartphone 210 configured with trajectory programming for controlling flight and lase base operations via said Flight Control Subsystem 1400 and via user interface 1500B, and the motor control subsystem 1500A.

Figure 14C:
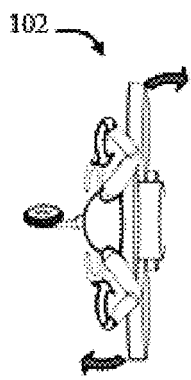
Figure 14D:
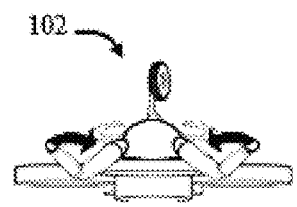
Figure 14E:
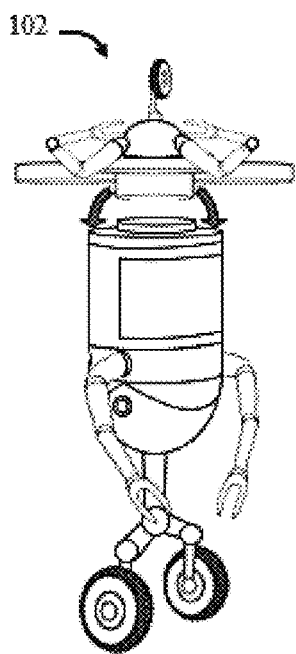

In greater detail FIG. 14B illustrates a Flight Control Subsystem 1400 for a flipping sequence of a drone device via flight plan 1401 is configured for said drone device to fly solo, wherein the Flight Control Subsystem 1400 linking with AI system processors 1516a-1516d comprising preprogrammed trajectory algorithms 1413 to control thrust 1413a, pitch 1413b and yaw 1413c; and comprising a trajectory algorithm 1414 to control hovering maneuvers to flip drone device 102 at vertical position 1414a; and to flip drone in upright position 1414b whereby the wheel is facing upright allowing a drone device 102 to dock on a landing platform 201a, and to flip drone body 202 the wheel device 700 downward 1414c so that said wheel device 700 can contact the ground. Respectively a flipping sequence processes 1401-1414 of the drone device 102 starts off with drone arms is a relaxed position; FIG. 14A schematically the drone device arms retract as depicted by the white curved arrows; depict the begin stage of the retracting action sequence; FIG. 14B schematically illustrates the flying sequence of a drone device 102, inverting as the black curved arrows depict and retracted arms are in a folded position; FIG. 14C schematically illustrates the flying sequence of a drone device 102 to be upside down, as simulated in FIG. 14D the drone device 102 is in a hovering in to complete a landing operation 1415 for docking the drone device onto the landing platform 201*a* of the mobile robot 101, as shown the two black curved arrows depict the begin stage of the docking action sequence of the drone device 102.

Figure 15:
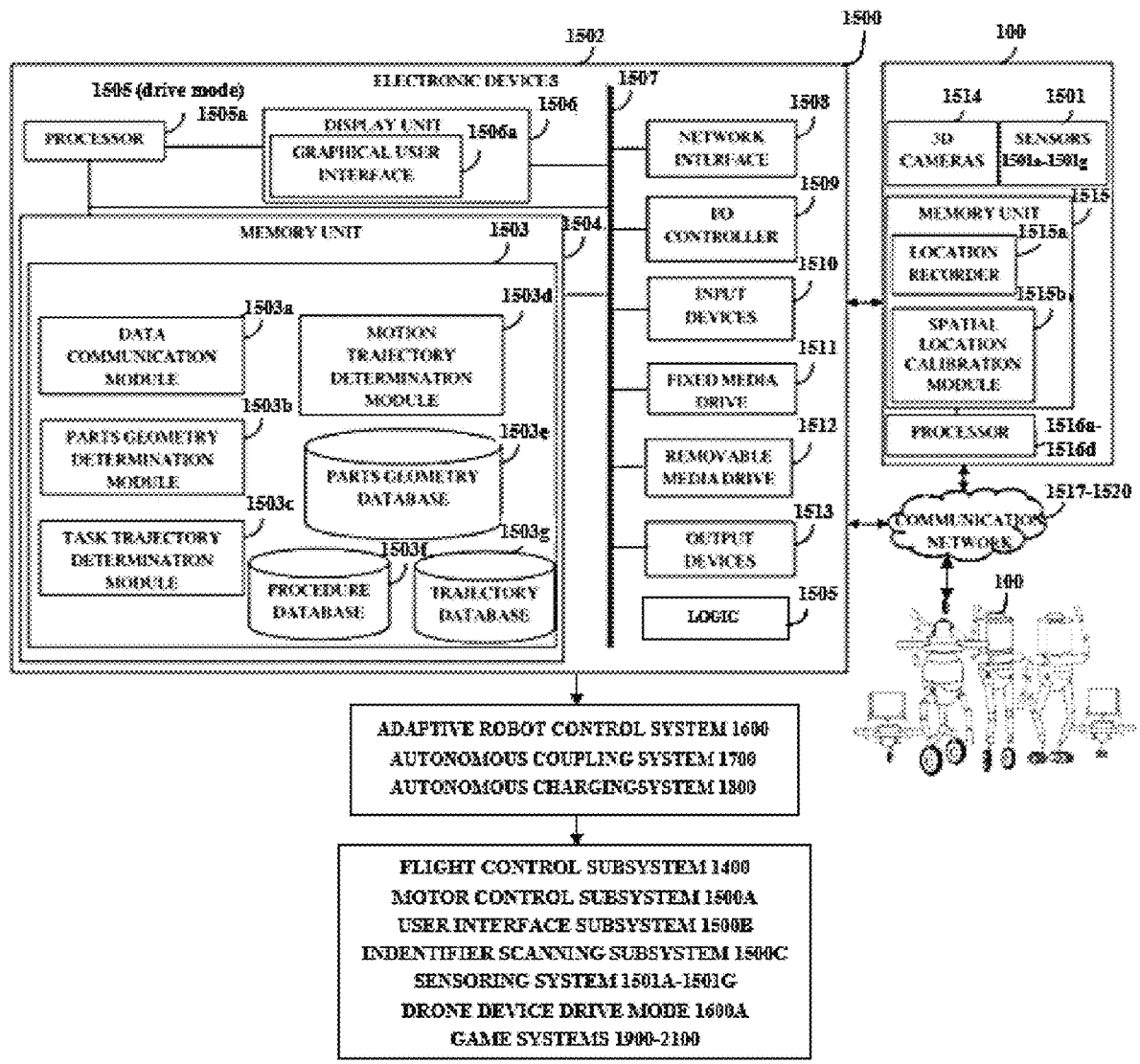
FIG. 15 schematically illustrates a block diagram of an AI System 1500 of the robot and drone array 100 in accordance with the present disclosure.

In greater detail FIG. 15 illustrates the AI system 1500, the system is communicatively coupled to Adaptive Robot Control System or (ARCS) 1600, a Drone Device Drive Subsystem 1600A, and Autonomous Coupling System 1700, and an Autonomous Charging System 1800; and a sensing system 1501 utilizing sensor devices; GPS environment mapping 1501*a* and LIDAR system 1501*b*, RADAR 1501*c*, and image sensors 1501*d*, optical sensors 1501*e*, position sensors 1501*f*, motion sensors 1501*g*, accordingly the sensors detect configurations of the work environment 107*a* for example; object characteristics of target objects and calculate positioning and movements of the target objects 106. The AI system 1500 and the Adaptive Robot Control System 1600 utilize a plethora of I/O electric devices 1502 including a non-transitory computer readable storage medium 1503. The non-transitory computer readable storage medium 1503, the modules non-transitory computer readable storage medium or (NTCRSM) microcontrollers; 1503*a*, 1503*b*, 1503*c*, 1503*d*, 1503*e*, 1503*f* and 1503*g*. The microcontroller 1503*b* is a parts geometry determination module, the microcontroller 1503*c* a task trajectory determination module, the microcontroller 1503*d* is a data communication for storing programs and via a data processor 1505 communicatively coupled to the non-transitory computer readable storage medium 1503; a data communication module 1503*a*, a parts geometry determination module 1503*b*, a task trajectory determination module 1503*c*, a motion trajectory determination module 1503*d*, a parts geometry database 1503*e*, a procedure database 1503*f*, and a trajectory database 1503*g* stored in the memory unit 1504 and a drive mode processor 1505 providing a level of artificial intelligent thinking modes for autonomous drivability via a drive mode processor 1505 having an input signal processor 1505*a* and a data communication module 1503*a* receives multiple images dynamically captured by the mobile robot 101 and drone device 102 cameras and the calibrated spatial location of the target object from, for example, the drone module 102 linked to a communication network 1517.

A Motor Controller Subsystem 1500A configured for controlling trajectory motion of; a mobile robot 101, a drone device 102, and a hybrid robot-drone 103; A User Interface Subsystem 1500B, said user interface subsystem 1500*b* for automatically creating an interaction between users and the mobile robots 101 and drone devices 102; and a Flight Control Subsystem 1400 utilize said data communication module 1503*a*, said parts geometry determination module 1503*b*, said task trajectory determination module 1503*c*, said motion trajectory determination module 1503*d*, said parts geometry database 1503*e*, said procedure database 1503*f*, and said trajectory database 1503*g* stored in the memory unit 1504. Wherein said data communication module 1503*a* receives multiple images dynamically captured by the drone device 102 and the calibrated spatial location of the target object from, for example, said drone module 102 linked to drive mode processor 1505 and said mobile robot 101 linked to a drive mode processor 1505 of the AI system 1500. An I/O controller 1509 for controlling devices operative to receive and send signals controls input actions and output actions performed by ARCS 1600 via a display unit 1506 or 308, the display unit 1506-308 comprises, for example, a video display, a liquid crystal display, a plasma display, an organic light emitting diode (OLED) based display, etc. The display unit provides GUI 1506*a* (graphical user interface) to receive the environmental parameters of the work environment 107*a* and the geometrical and geospacial information of the target object from a user via the GUI 1506*a*. The input devices 1510 are, for example; a microphone, a touchscreen display device 1506-308 configured with a network interface 1508. The network interface 1508 utilizes input/output (I/O) controller 1509, input devices 1510, and a fixed media drive 1511 such as a hard drive, a removable media drive 1512 for receiving removable media, and output devices 1513. The user 104 uses the input devices 1510 for inputting the environmental parameters of the work environment and the geometrical information of the target object into the ARCS via the GUI 1506*a*, and transmission media 1515 as used, all computer readable media, for example, non-volatile media, volatile media, and transmission media, except for a transitory propagates a signal established from a world knowledge base 1601 provided by the adaptive robot control system 1600. The non-transitory computer readable storage medium is configured to store computer program instructions defined by modules, for example, 1515*a* and 1515*b*, 1515*a* is a location recorder for recording mobility function images, and 1515*b* is a spatial location calibration module to transition in multiple environments 700 while comparing target objects 106.

The network interface 1508 and the data bus 1507 permits communications, the microcontroller 1503*e* is a parts geometry database, the microcontroller 1503*f* is a procedure database, and the microcontroller 1503*g* is a trajectory database, and accordingly, each are configured as a cloud-based database implemented in a cloud computing environment, where computing resources are delivered as a service over the communication network 1517 and enable connection of the ARCS electronic devices 1502 to communication networks 1517. In various elements, the sensors 1501 comprises one or more LIDAR and environment tracking sensors, three-dimensional (3D) cameras 1514, one or more and a location recorder 1515*a* and a spatial location calibration module 1515*b* that are installed and stored in the memory unit 1515. The one or more sensor 1501 and 3D cameras 1514 mounted on the body of the mobile robot 101 and the body of the drone module 102 to dynamically capture multiple images of a target object to be operated on in a work environment from multiple directions, while the robot and drone array 100 navigates independently in multiple directions around the target object 105 in the environment 107 and accesses inaccessible areas with respect to the target object 106 in the environment 107. The memory unit 1515 is used for storing program instructions, applications, and data. The memory unit 1515 is, for example, RAM or another type of dynamic storage device that stores information and instructions for execution by said data processor 1505. The memory unit 1515 also stores temporary variables and other intermediate information used during execution of the instructions by the processors 1516*a*-1516*d* comprising processing logic for accomplishing tasking objectives and handing objectives in one or more locations via a location recording, wherein location recorder 1515*a* of the memory unit 1515, the location recorder 1515*a* records a spatial location functions of the target object using the dynamically captured images of the target object in the environment and sensor data, e. g, 1501*a*-1501*g*, obtained from said location recorder 1515*a* to prepare one or more maps of the environment 107 using one or more 3D cameras 1514 and using a spatial location calibration module 1515*b* for dynamically calibrating the recorded spatial location of the target object in communication with one or more 3D cameras 1514 based on environmental parameters of the robot and drone array 104. Wherein, the spatial location calibration module 1515*b* compares the target object encountered during the navigation of the robot and drone array 104 with target objects stored in the ARCS 1600 to obtain the discernment of the target object, for example a communication network 1517 for example, for corresponding to the current location of a target object and the identification of the target objects, the process is disclosed in ARCS methods 1600. The communication network 1517 is, for example, the internet, an intranet, the wireless cloud-based network 1518 that implements Wi-Fi® of Wi-Fi Alliance Corporation, an ultra-wideband communication network (UWB), a wireless universal serial bus (USB) communication network, employs the operating system for performing multiple tasks via communication network 1517 the wireless cloud-based network 1518. In one aspect the Identifier Scanning Subsystem 1500C configured for identifying users, mobile robots, drone devices and target objects in a work environment and game environment by means of code numbering a processor code map 1516*a* configured to create and store identity code numbers to said memory unit 1504 which is configured to link with a communication network linking to a Cloud Based Analysis of Robotic System Control Component and Data Usage Network 1519 via the internet of things; and a network with a control station 1520 located remotely. In an embodiment, the adaptive robot control system (ARCS) 1600 is activated on the electronic device 1502 via the graphical user interface 1506*a* linking with the user interface subsystem 1500A. First, selecting an autonomous vehicle for example the mobile 101 based at least in part on an identifier scanner component 307. Next, selecting a second autonomous vehicle for example the drone device 102 based at least in part on a second identifier: drone scanner component 102*o*.

Figure 16A:
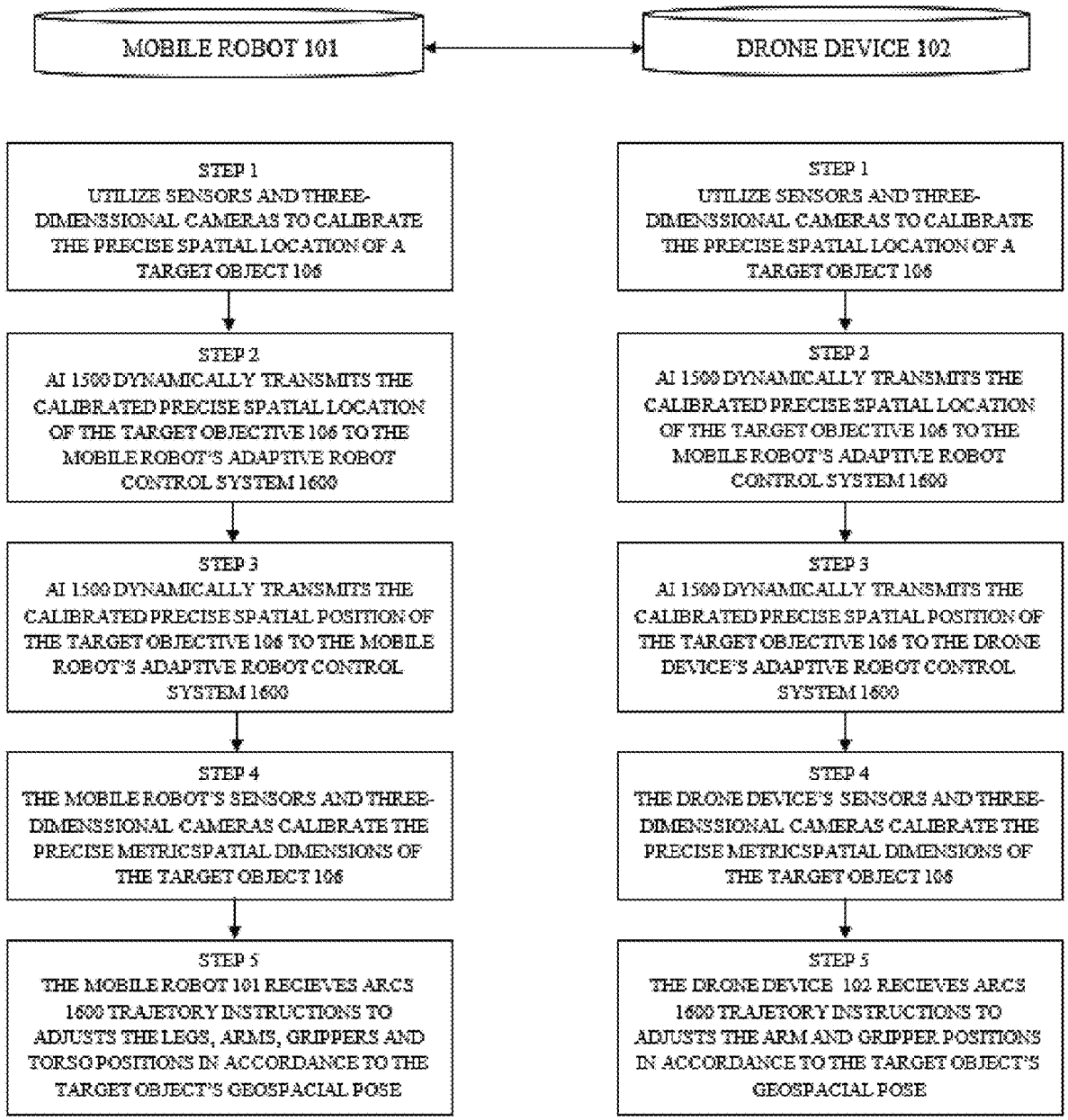
FIG. 16A-FIG. 16B schematically illustrate block diagrams for an Adaptive Robot Control System 1600 sequence processes for task and handling objectives in accordance with the present disclosure.
Figure 16B:
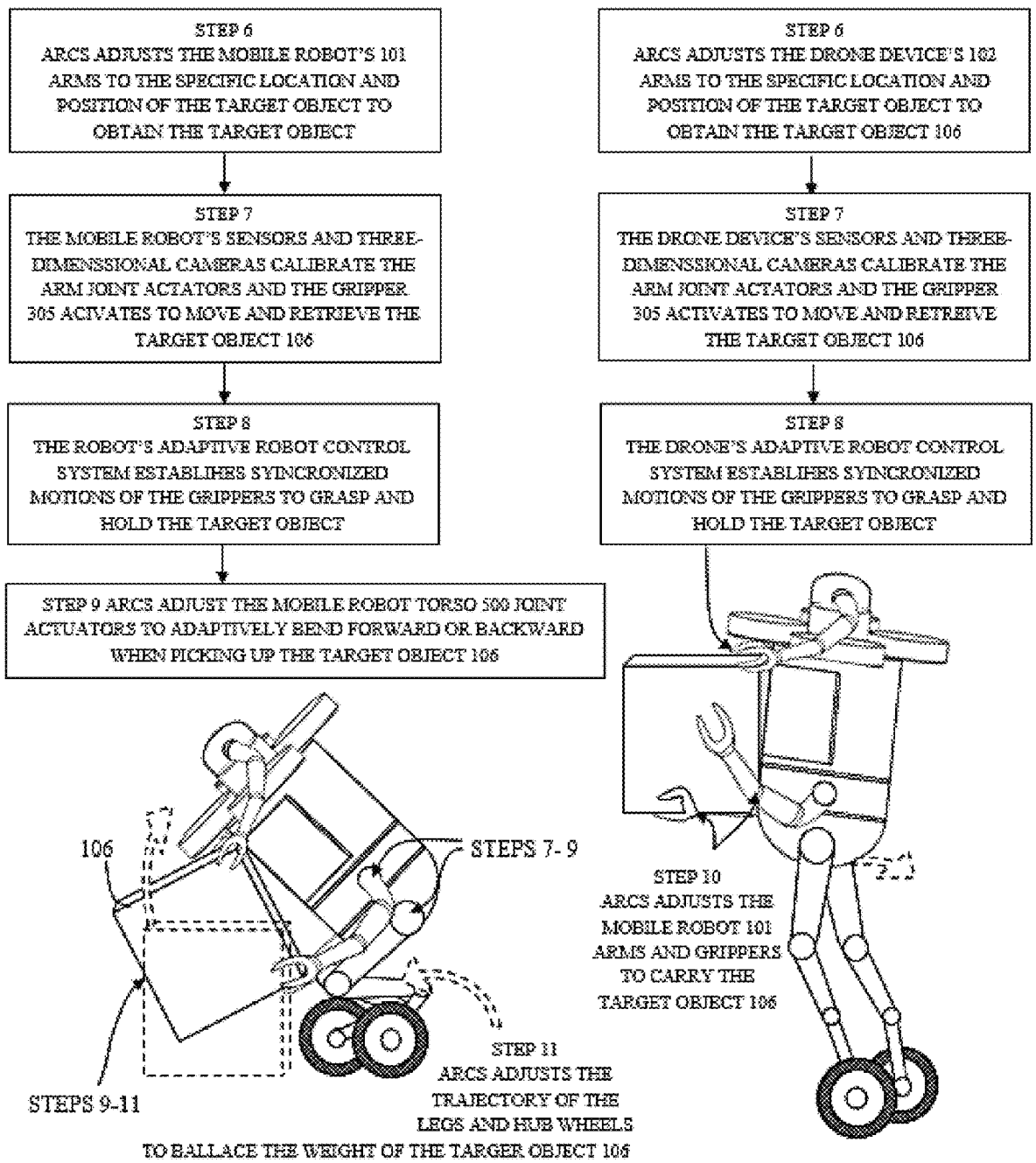

In greater detail FIG. 16A and FIG. 16B illustrate an Adaptive Robot Control System 1600 or (ARCS), as used herein is communicatively coupled to the AI system processing logic utilizing a world knowledge base 1601 comprising computer readable storage medium is configured to store computer program instructions defined by modules, for example, the world knowledge base 1601 records mobility functions and images of target objects, and ARCS calibrates the spatial location of the target object in an environment based on the environmental parameters of the environment and calibrates a spatial position of the target object in the work environment to navigate around the target object and records geometrical information of a target object to be operated in the work environment, the target object characterized as: a mobile robot 101, and a drone device 102, and a hybrid robot-drone 103, the drone device further comprises a subsystem Drone Device Drive Mode 1600A, said Drone Device Drive Mode 1600A comprises ARCS control method 1611*a*-1611L.

The Drone Device Drive Subsystem 1600A comprising: the drone device—ARCS input/output interface 1611*a*; a memory with plurality of instructions 1611*b*; a processor in communication with the memory 1611*c*; a computer to a drone a message to cause the drone to fly to a specific location within a facility 1611*d*; and to fly to a specific location within a drone restricted zone and when entering a restricted zone, to determine when the drone device has reached the specific location 1611*e*; a processor of a drone device to determine when the drone has reached the specific location 1611*f*; a processor of a drone device to cause the drone to enter a hover mode, where the drone remains in a substantially fixed location hovering over the specific location within the facility 1611*g*; a processor of a drone device to receive sensor data from a sensor carried by the drone 1611*h*; a processor of a drone device to apply processing to the sensor data to detect an unacceptable level of detected feature differences in features contained in the sensor data at the location in the facility 1611*i*; and to cause the drone device to enter a hover mode 1611*j*, where the drone device remains in a substantially fixed location hovering over the specific location and engage the landing gear of the drone device; and causing the drone device 102 to terminate the hover mode 1611*k*; and activate an adaptive robot control system and activate a drive wheel motor control system 1500A to control the steering and velocity of the drone device drive wheel 700 to drive the drone device 102 to a predetermined destination 1611L.

Figure 17A:
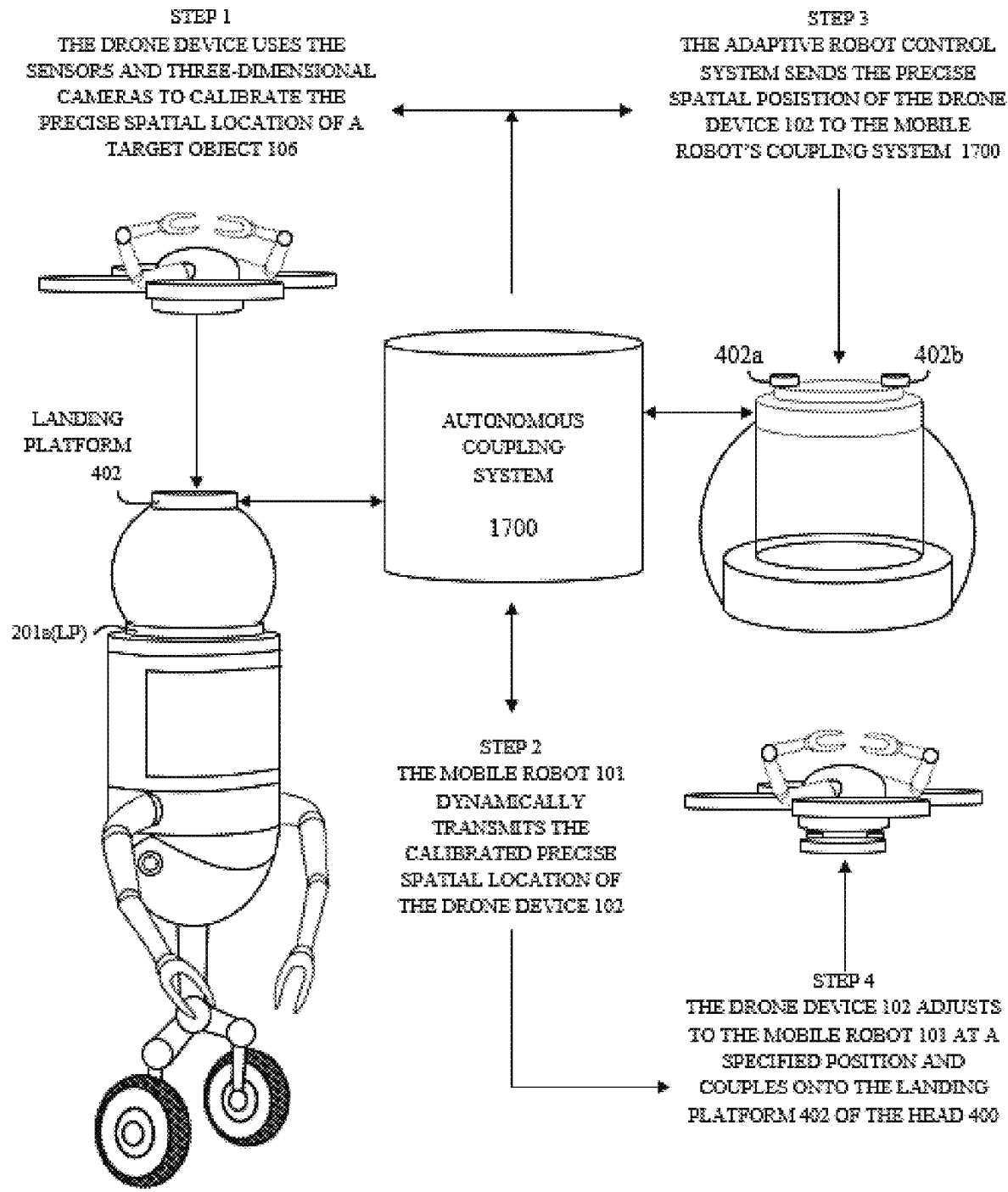
FIG. 17A-FIG. 17B schematically illustrates a block diagram of an Autonomous Coupling System 1700 of the mobile robot and drone device coupling and latching sequences in accordance with the present disclosure.
Figure 17B:
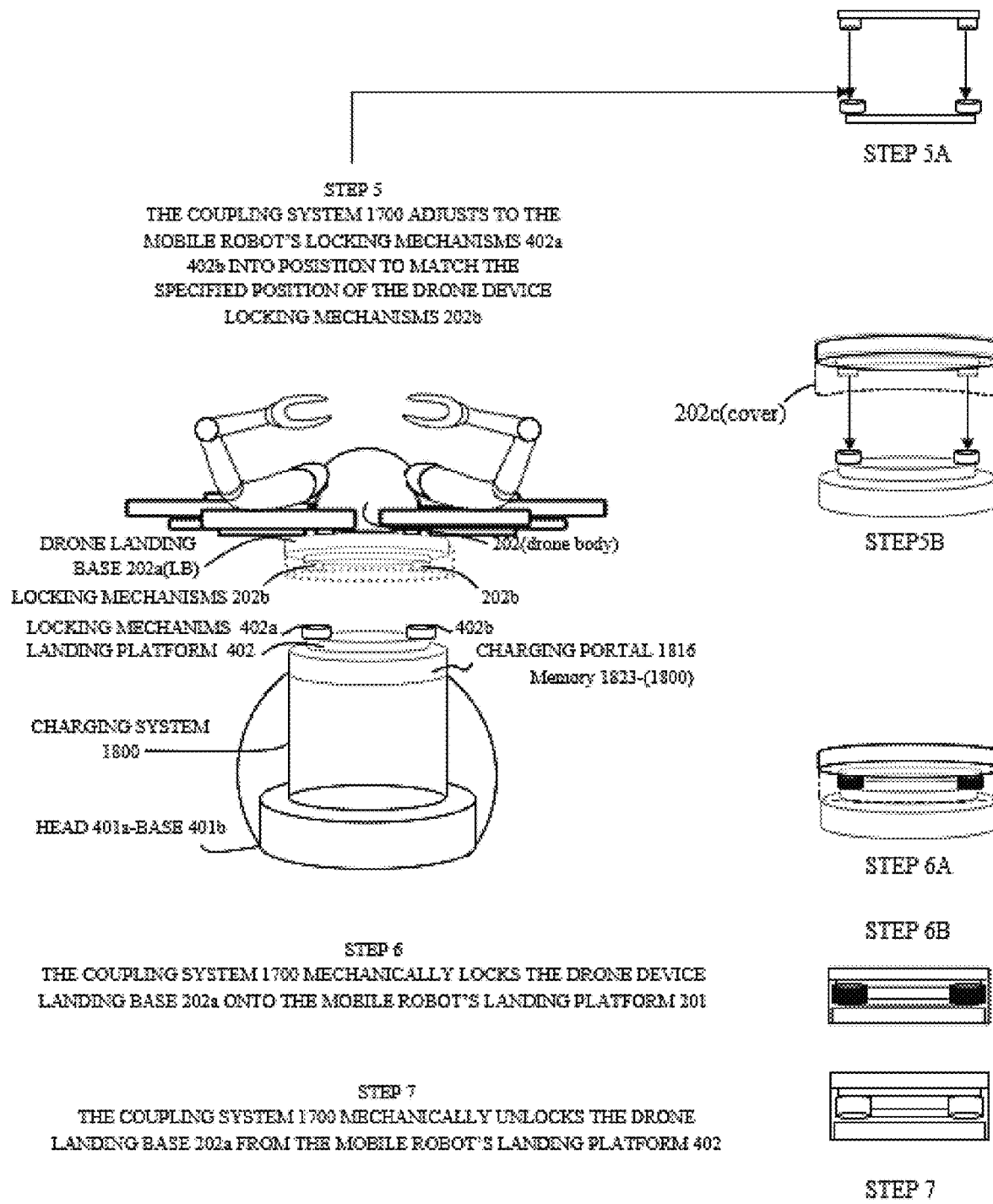

In greater detail FIG. 17A and FIG. 17B illustrate a coupling sequence, the method comprising: Step 1. The drone device 102 utilizing sensors and three-dimensional cameras to calibrate the precise spatial location of a target object 106; Step 2. The mobile robot 101 dynamically transmits the calibrated precise spatial location of the drone device 102; Step 3. The adaptive robot control system sends the precise spatial positions of the drone device 102 to the mobile robot's coupling system 1700; Step 4. The drone device 102 adjusts to the mobile robot 101 at a specified position and couples onto the landing platform 201*a*/401; Step 5. The coupling system adjust to the mobile robot's locking mechanisms 402*a*, 402*b* positions to match the specified position of the drone device's locking mechanisms 202*i*; Step 6. The autonomous coupling system 1700 mechanically locks the drone device landing base 202*g* onto landing platform 201*a*/402, and Step 7. The coupling system 1700 mechanically unlocks the drone device landing base 202*g* from landing platform 201*a*/402. In various methods, a series of processes for calculating distances obtained information data from laser point sets, combining laser measuring values of the three points by judging whether to perform point set division on the laser points or not; and methods comprising: dividing the dividable laser points to acquire grouped point sets; dividing each grouped point set into two groups, and performing least square method fitting on each group of point sets (e.g., x, y, and z) to acquire a linear map collection; judging whether parameters of the point sets and the linear map collections are matched with features of a charge portal or not; if a matching result shows that only two straight lines matched with the features of the charge portal are reserved, calculating a pose coordinates of the mobile robot according to equations of the two straight lines and the position of the charge portal on the mobile robot's landing platform and the drone device's landing base locking mechanisms. As shown in FIG. 17C a latching sequence of the autonomous coupling system 1700, as the latching process shows a coupling operation followed by a separating operation 1710-1711. Wherein said landing platform 201*a* further comprises a female locking mechanism extending upward from the landing platform 201*a*, and wherein said drone device landing base 102*g* further includes a male locking mechanism 102*h* extending downward to mate with the female locking mechanism of the mobile robot, wherein the mobile robot female locking mechanism latches about the drone device male locking mechanism, wherein said locking mechanisms are configured with a mechanical locking means, a magnetic locking means, or a combination thereof.

In greater detail FIG. 18 schematically illustrates an Autonomous Charging System 1800, the mobile robot 101 utilizes its battery power to power a drone device 102, the charging process of a battery in this case a drone smart battery 1811, e. g., examined as 204(B) comprising a receiver 1812. The power source receiver is coupled to receive power from a battery type. In one embodiment, power source receiver 1812 coupled to the positive and negative terminals of battery. The battery 204/1811 make comprising sensors 1811a, battery chemistry 1811c of battery, battery life value 1811d to the receiver 1812, and a means for processing logic 1818 storing the battery chemistry data 1811e in the battery's memory module 1823. Wherein the battery receiver 1812 and battery sensors 1811a are coupled to the positive and negative terminals life value is transmitted from the smart battery's receiver 1812 of the drone device 102 landing base 202f/202g. The battery life value may give the drone device 102 an accurate time or power remaining so that the drone device 102 can calculate the amount of air-time it has left and return to land on a mobile robot's landing platform (e.g. 201). The process includes executing the autonomous charging system operation to charge smart battery, lithium battery pack or other battery type by a charger portal 1813 situated on the mobile robot's landing platform via coupled locking mechanisms. The process includes by initiating a charger portal 1813 and measuring voltage of a battery, the battery voltage or other simple measurement techniques combining laser measuring values of the three: x, y, z laser point sets 1814a of the drone device 102. The autonomous charging system operations for taking analyzing measurements and receiving measurements and storing memory of a series of laser point sensor measurements, and a process to acquire grouped point sets 1814a via a measurements module 1816, and to determine a remaining battery life time value 1815 of the smart battery 204 or other battery type; and a process for transmitting the remaining battery life time value 1815 from a communication interface 1817 and transmit the remaining battery life time value 1815 to a receiver 1812; 1801. Execute operations by initiating a wireless charger portal 1813, and a measurement module 1816, a series of measurements of the electrical characteristics of the smart battery 204 or other battery type over time; 1802. Storing the series of laser points; taking every three x, y, z laser point sets 1814a as a group; and combining laser measuring values of the three: x, y, z laser point sets 1814a of the drone device sensor 1811; 1803. Analyzing a series of laser points measurements to determine a remaining battery life time value 1815 of the smart battery 204; and transmitting the remaining battery life time value 1815 from the communication interface 1817 to a receiver 1812. 1804. Calculating distances among the laser points 1814 respectively and initiating, by processing logic 1818, a first electrical measurement 1819 of a battery at a first time, wherein the battery and the processing logic 1818 are included in a smart battery 1811/204; 1805. Judging whether to perform point set division on the laser points 1814 or not; dividing the dividable laser points to acquire grouped point sets 1814a; 1806. Storing first an electrical data representative 1820 of the first electrical measurement 1819 in a memory module 1823 included in the smart battery 1811/204; 1807. Initiating, by processing logic 1818, a second electrical measurement 1821 of the smart battery sensor 1811a at a second time 1821 following the first time 1819; 1808. Storing second electrical data representative 1822 of the second electrical measurement 1821 in the memory module 1823 included within the smart battery 1811/204; 1809. Determining, with the processing logic 1818 of the smart battery sensor 1811a, a battery life time value 1811d based at least in part on the first electrical data 1820 and second electrical data 1822; and 1810. Transmitting, with a communication interface 1817 of the smart battery, the battery life time value 1811d to the receiver 1812 and storing the battery chemistry data 1811e in the battery's memory module 1823. The smart battery 1811/204 includes a plurality of battery cells and wherein the first electrical measurement includes measurements a measurement module 1816 is configured to measure the voltage of each battery cell of battery from nodes 202g of each battery cell, to receive measurements from one or more temperature sensors 204a; and methods comprising: dividing the dividable laser points to acquire grouped point sets; dividing each grouped point set into two groups, and performing least square method fitting on each group of point sets 1814a (x, y, and z).

Figure 19:
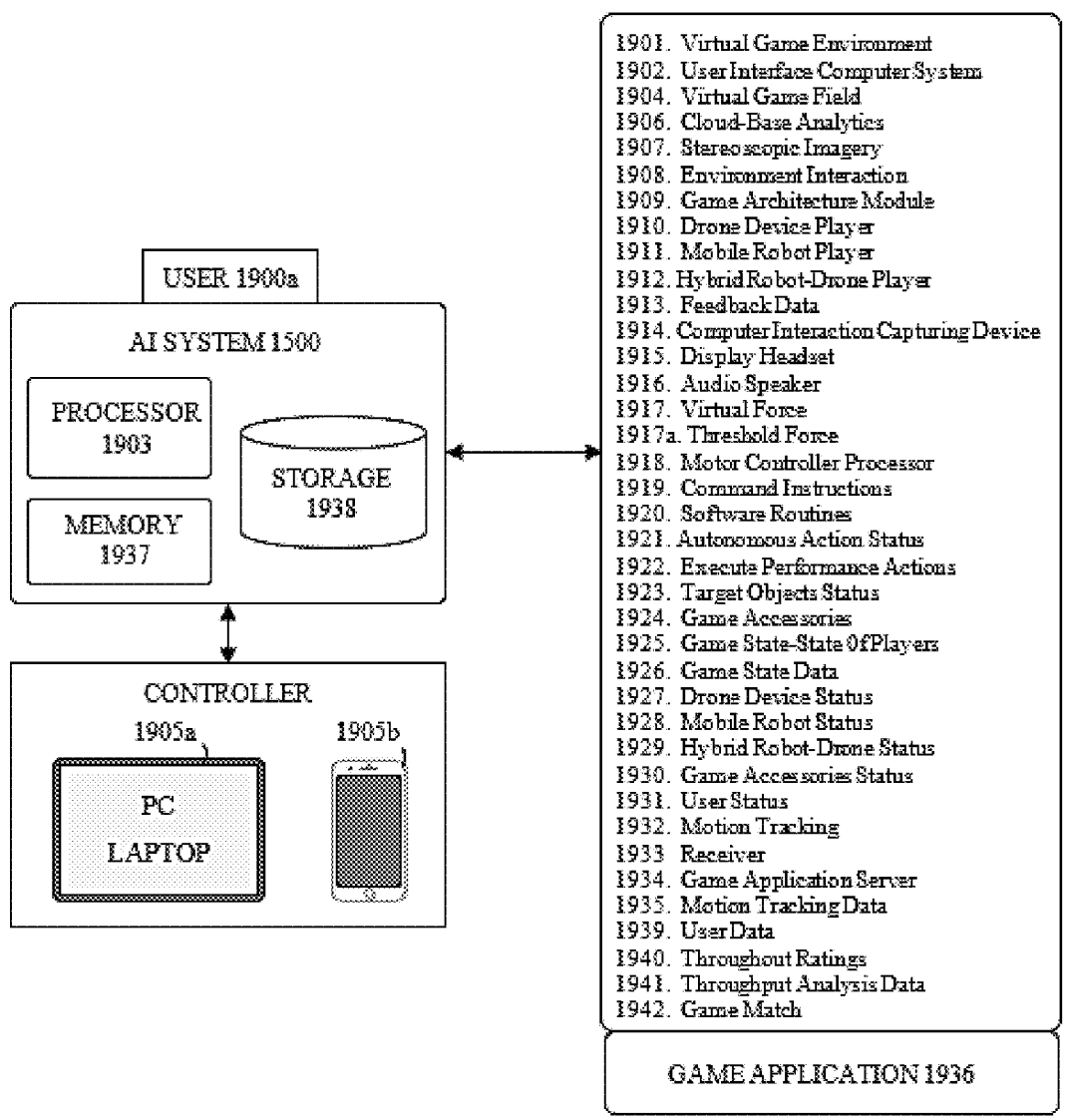
FIG. 19 schematically illustrates a block diagram of a real-time game system 1900 of the robot and drone array 100 in accordance with an embodiment of the disclosure.

In greater detail FIG. 19 illustrates a game system 1900, wherein users 1900a play in a real-time game environment 1901-1927 comprising multiple players and a user interface computing system 1902, said user interface computing system being electronically coupled to a game processor 1903, a playing field 1904 of the linking the user 1900a with wireless controller device 1905 to a cloud-based analytics platform 1906 to visualize a stereoscopic image 1907 in the playing field 1904; wherein the user interface computing system 1902 is linked with an wireless controller device 1905 which is configured as; a PC laptop 1905a and a Bluetooth smartphone 1905b, a virtual reality headset device 1905c, or a handheld device 1905d, or a combination thereof, accordingly the wireless controller device 1905 configured to be electronically coupled to the processor 1903, wherein the user interface computing system 1902 is compatible with android, iOS, and windows; wherein the plurality of actions 1908 executed by the electronic controller device from a real-time game environment includes interaction 1908a, navigation 1908b, and a game architecture module 1909 to control a drone device 1910 "player," a mobile robot 1911 "player," and a hybrid robot-drone 1912 "player," in a real-time game environment 1901, (e, g., the mobile robot, the drone device, and the hybrid robot-drone are configured with AI system input device; a built-in smartphone and an identifier scanning device and processors for receiving high level programming command instructions to engage strategy in a real-time game system playing field environment); wherein the game architecture module 1909 to execute a plurality of actions using the drone device player 1910, the mobile robot player 1911, and the hybrid robot-drone player 1912 comprise a wireless communication network 1913 configured within the real-time game environment 1901; wherein the plurality of actions played by the drone device player 1910, the mobile robot player 1911, and the hybrid robot-drone player 1912 are linked to an audiovisual display or headset 1915 comprising an audio speaker 1916 based on a status of the real-time game environment 1901; the wireless communication network 1913 linking with one or more drone device players 1910, mobile robot players 1911, and hybrid robot-drone players 1912; the playing field 1904, e. g., game environments, categized as rooms, or game fields which include land-based sport arenas, race and track fields, aerial arenas, and structures situated in and on land, ocean and space; a match 1917 controlled by a user interface electronic controller device configured for controlling gameplay elements on a game playing field; an identifier scanning system of the one or more mobile robot and drone players 1910-1912 comprising image recognition software of the programmed to receive data from the track the motion data of game playing field elements and target objects, and to store motion tracking data in memory linking to a cloud-based analytics platform 1906 to visualize a stereoscopic image 1907 in the playing field 1904, wherein the mobile robot and drone players 1910-1912 comprise a built-in smartphone device linking to the game to a wireless communication network 1913, wherein the built-in smartphone device of the mobile robot, the drone device, and the hybrid robot-drone, for receiving high level programming command instructions linking to a motor control subsystem processor of the AI system 1500; a processor configured to automatically instruct a motor control subsystem processor to summon the mobile robot and to summon the drone device and to summon the hybrid robot-drone to play a match 1917, the match 1017 determined by a user via the user interface computing system 1902; a processor configured to automatically instruct a motor control subsystem 1918 processor to navigate the one or more drone device players 1910, mobile robot players 1911, and hybrid robot-drone players 1912 by a user 1900a via the user interface computing system 1902; a processor 1903 configured for receiving high level command instructions 1919 from a wireless controller device 1905 relaying executing software routines 1920 and strategy instructions 1921 related to the high-level command instruction 1919; a high-level command instruction 1919 to execute autonomously perform actions 1922 in a programmable manner in the playing field 1904 according to the respective strategy instructions 1921 directed by a user 1900a; a high-level command instruction 1919 to execute autonomously perform actions in a programmable manner in the playing field according to the respective software routines 1920; a user directing to execute a sequence of autonomous actions 1922 and achieve performance actions 1922 with or without further command instructions from the user 1900a, allowing wireless controller device 1905 to simultaneously control one or more target objects 1923 and game accessories 1924 on a playing field 1904, other robot and drone players and game related accessories 1924 in the autonomous mobile robot's vicinity, and in the autonomous drone device's vicinity, and in the playing field 1904; at least one remote controlled drone device player 1910, mobile robot player 1911, and hybrid robot-drone player 1912 to receive high level command instruction to directly control drive wheels and joint actuators in such a way that the wireless controller device 1905 actively steers the drone device player 1910, the mobile robot player 1911, and the hybrid robot-drone player 1912, and actively controls the game related accessories 1924 and target objects 1923 in the playing field 1904; one or more high level command instructions to allow the remote controlled mobile robot to avoid obstacles, to seek out and engage other opposing drone device players 1910, mobile robot players 1911, and hybrid robot-drone players 1912, to interact with one or more game related accessories in the playing field, and to complete task objectives within the context of the game environment while under the direct control of the wireless controller device 1905 via the game architecture module 1909; a memory of the transmitting game information of the state 1925 of the drone device player 1910, mobile robot player 1911, and hybrid robot-drone player 1912 to a wireless controller device 1905 which information is displayed on the display of the wireless controller device 1905; wherein the transmitted information includes status information 1926 on a game state information 1925, thereby allowing an operator of a remote controller unit to monitor the status information 1927 of a drone device player 1910, the status information 1928 of the mobile robot player 1911, and the status information 1929 of the hybrid robot-drone player 1912 with respect to their physical status and game parameters 1927; and the status information 1929 of one or more target objects 1923 and the status information 1930 of the game accessories, and the status information 1931 of the user 1900a, and the AI system 1500 to generate motion tracking data 1932, via a receiver 1933 and a server 1934 with game logic programmed to control aspects of the game based on said motion tracking data 1935 via a receiver 1933, the receiver receiving by the game application 1936, game application comprising processor 1903 and a memory 1937 and a storage device 1939 for receiving a plurality of data throughput ratings 1940 from a plurality of user interface computing systems 1902, each associated with a user interface computing system 1902 of the plurality, and based, at least in part, on throughput analysis data 1941 associated with the storage device 1939 of the corresponding user interface computing system 1902; and the processor 1903 the user status information 1931 determining the presence of the one or more users playing a match 1942.

Figure 20:
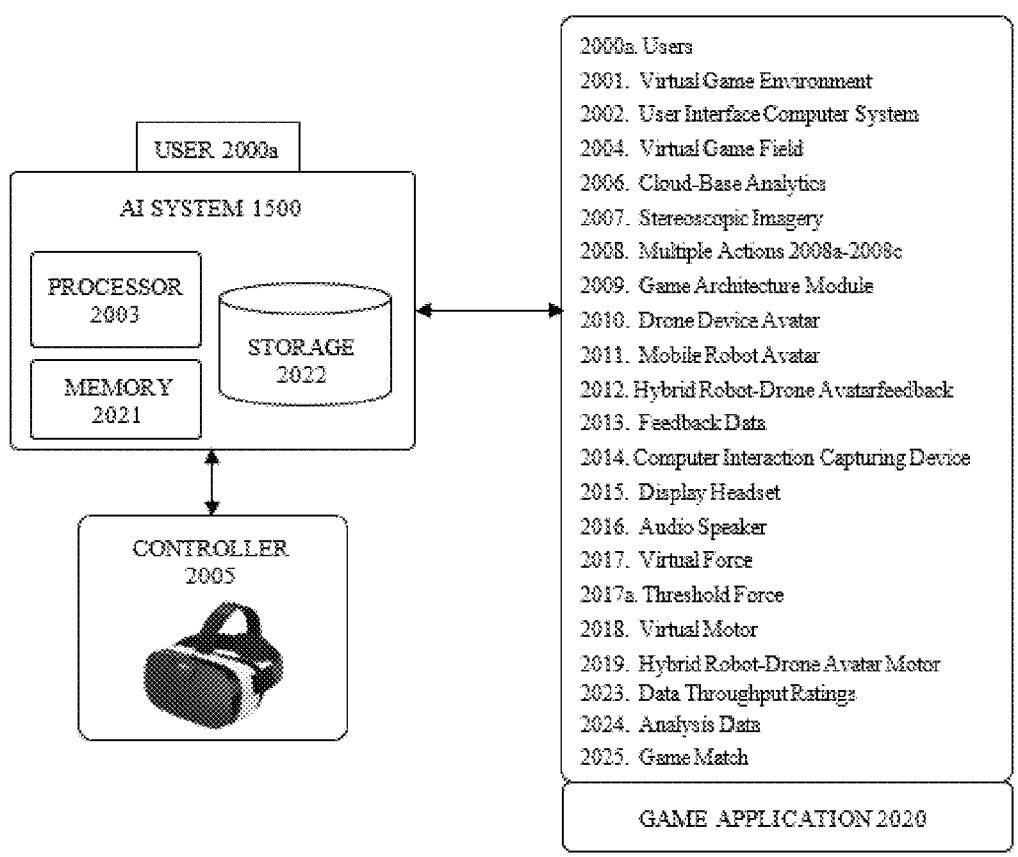
FIG. 20 schematically illustrates a block diagram of a virtual reality game system 2000 of the robot and drone array 100 in accordance with an embodiment of the disclosure.

In greater detail FIG. 20 illustrates the Virtual Reality Game System 2000, wherein users 2000a play in a computer generated game environment 2001-2020 comprising: a user interface computing system 2002 electronically coupled to a processor 2003, a virtual game field 2004 of the linking the user 2000a with wireless controller device 2005 to a cloud-based analytics platform 2006 to visualize a stereoscopic image 2007 in the virtual game field 2004 comprising virtual players or (avatars), wherein the user interface computing system 2002 is linked with an wireless controller device which is configured as; a PC laptop 2005a and a Bluetooth smartphone 2005b, a virtual reality headset device 2005c, or a handheld device 2005d, or a combination thereof, accordingly the wireless controller device 2005 configured to be electronically coupled to the processor 2003, wherein the user interface computing system 2002 is compatible with android, iOS, and windows; wherein the plurality of actions 2008 executed by the electronic controller device from a virtual game environment includes interaction 2008a, navigation 2008b, and a game architecture module 2009 to control a virtual drone device avatar 2010, a virtual mobile robot avatar 2011, and a virtual hybrid robot-drone avatar 2012 in a virtual game environment 2001; the game architecture module 2009 to execute a plurality of actions using the drone device avatar 2010, the mobile robot avatar 2011, and the hybrid robot-drone avatar 2012 from the virtual game environment 2001, wherein the plurality of actions 2011 comprised of audiovisual content to a display headset 2015 and audio speaker 2016 based on a status of the virtual game environment 2001; wherein the game architecture module 2009 comprising methods detecting an event that occurs within broadcast data content 2012 while a plurality of users 2000a are viewing the broadcast data content; when the event is detected, automatically capturing user feedback data 2013 with a user computer interaction capturing device 2014 from each user 2000a; wherein game architecture module 2009 to execute a plurality of actions executed by; the drone device avatar 2010, the mobile robot avatar 2011, and the hybrid robot-drone avatar 2012 in a virtual reality environment, issue the audio-visual content to the display headset 2015 and audio speaker 2016 based on a status of the virtual game environment 2001, and based on a magnitude and direction of the virtual force 2017; wherein the one or more processors 2003 are configured to project the drone device avatar 2010, the mobile robot avatar 2011, and the hybrid robot-drone avatar 2012 in the virtual environment game field 2001a; wherein the one or more processors are configured to receive a user-originated command 2018, modify a status of an avatar of a drone device based on the user-originated command and a status of the virtual game environment 2001, and control the drone device avatar based on the modified status of the drone device avatar; wherein the one or more processors 2003 are configured to receive a user-originated command, modify a status of an avatar of a mobile robot based on the user-originated command and a status of the virtual game environment 2001, and control the mobile robot avatar based on the modified status of the mobile robot avatar; wherein the one or more processors 2003 are configured to receive a user-originated command via the user interface electronic controller device, too modify a status of an avatar for example, of a hybrid robot-drone avatar 2012 based on the user-originated command and a status of the virtual game environment 2001, and control the hybrid robot-drone avatar 2012 based on the modified status of the hybrid robot-drone avatar 2012; wherein the one or more processors are configured to, upon determining that a virtual force 2017 has been applied onto the avatars, compare the virtual force to a threshold force 2017a, and based on the virtual force 2017 exceeding the threshold force 2017a, control the virtual motor 2018-2019 based on a magnitude and direction of the virtual force 2017; a virtual motor 2018 of the drone device avatar 2010, a virtual motor 2019 of the mobile robot avatar 2011, and multiple virtual motors 2018-2019 of the hybrid robot-drone avatar 2012 or, a space robot avatar 101(4), and control other based on a magnitude and direction of the virtual force 2017, and the AI system 1500 to generate motion tracking data 2125; a game application 2126 comprising a game application server 2020 with game logic programmed to control aspects of the game based on said motion tracking data 2124; a receiver 2128, the receiver receiving by the game application server 2020 comprising a processor 2003 and a memory 2021 and a storage device 2022 for receiving a plurality of data throughput ratings 2023 from a plurality of user interface computing systems 2002, each associated with a user interface computing system 2002 of the plurality, and based, at least in part, on throughput analysis data 2024 associated with the storage device 2022 of the corresponding user interface computing system 2002; and the processor 2003 selecting and initiating a game match 2025.

Figure 21:
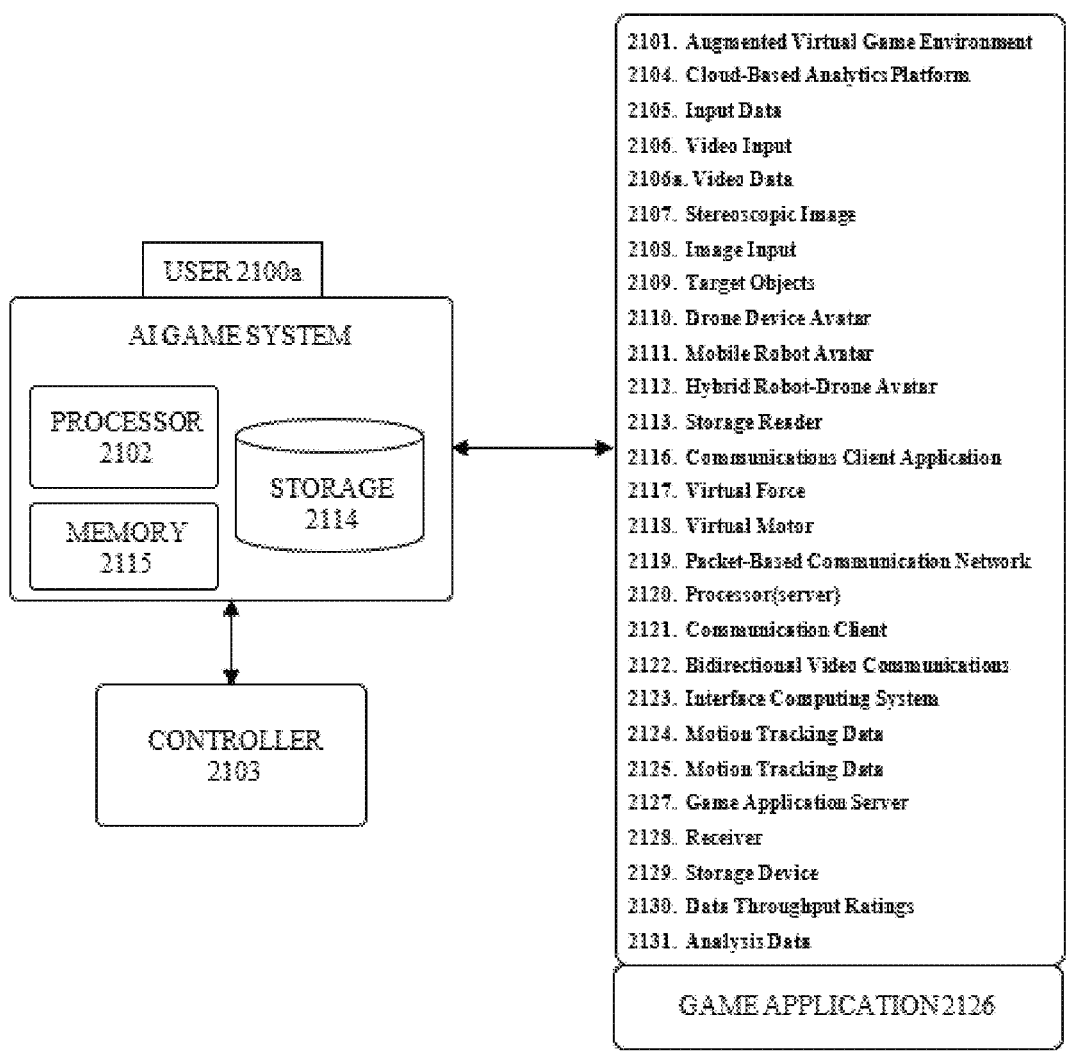
FIG. 21 illustrates a block diagram of an augmented virtual game system 2100 for a E Sports game platform in accordance with an embodiment of the disclosure.

In greater detail FIG. 21 illustrates the augmented virtual game system 2100, wherein users 2100a play in an augmented virtual game environment 2101-2132 comprising: a user interface computing system 2102, and a user interface electronic controller device 2103, wherein the user interface computing system 2102 linking the user interface electronic controller device 2103 to a cloud-based analytics platform 2104; and the user interface computing system 2102 for automatically analyzing received input data 2105; the input data 2105 from; video input 2106, audio input 2107 and image input 2108, configured for generating visual data of target object elements 2109 in an augmented virtual game environment 2101; the target objects include; a drone device avatar 2110, a mobile robot avatar 2111, a hybrid robot-drone avatar 2112, and a space robot avatar 101(4); a storage reader 2113 for reading a game application from a storage medium 2114; a memory 2115 storing a communications client application 2116; a network interface 2117 for receiving data 2118 from a remote user 2100b via a packet-based communication network 2119; and processing apparatus 2120 coupled to memory 2115 in a network interface 2117, wherein a communication client 2121 is programmed to establish bidirectional video communications 2122 via said network interface 2117 and packet-based communication network 2119, including receiving video data from one or more users 2100a via and remote users 2100b via a plurality of user interface computing systems 2123; and image recognition software 2124 programmed to receive video data 2106a from a client application 2116, and to recognize a predetermined image element in the received video data 2106a, and track the motion of target object elements 2109 to generate motion tracking data 2125; a game application 2126 comprising a game application server 2127 with game logic programmed to control aspects of the game based on said motion tracking data 2124; a receiver 2128, the receiver receiving by the game application server 2127 with a storage device 2129 receiving a plurality of data throughput ratings 2130 from a plurality of user interface computing systems 2123, each associated with a user interface computing system 2123 of the plurality, and based, at least in part, on throughput analysis data 2131 associated with the storage device 2129 of the corresponding user interface computing system 2123; and the receiver 2128 selecting and initiating a game match 2132 selected by the game application server 2127, and by the interface computing system 2123 which is configured to display an augmented virtual reality game system 2100 configured with an array of drone device avatars 2110, mobile robot avatars 2111, and hybrid robot-drone avatars 2112 and other target objects to compete game match via multiple players on a packet-based communication network 2119.

Accordingly, it is to be understood that the above description is intended to be illustrative and not restrictive. Many embodiments and applications other than the examples provided would be apparent upon reading the following descriptions. The scope should be determined as set forth above has been disclosed in its preferred form(s), the specific embodiments thereof as disclosed and illustrated are not to be considered in a limiting sense, because numerous variations are possible.

I claim:

1. A robot and drone array comprising:
a mobile robot cooperating with a drone device respectively, or a hybrid robot-drone comprising a mobile robot integrated with a drone device;
said mobile robot and said drone device, when connected, are capable of handling one or more task objectives as peers, such that both can assist one another to carry a payload, both can manipulate target objects via teamwork, both can become airborne; when disconnected, each are capable of handling one or more task objectives, such that each can carry a payload individually or each can manipulate target objects individually;
the mobile robot or the drone device may include framework and autonomous drive system components which may include vehicle framework components, humanoid robot components, aerial framework components, aerospace framework components, amphibious framework components, or a combination thereof;
a landing platform configured for connecting or disconnecting said mobile robot to/from said drone device;
one or more drive wheel arrangements;
an AI system said AI system associated with one or more processors configured to control a balance maneuver, a steering maneuver, or braking of said footing arrangement or said drive wheel arrangement;
one or more processors configured for controlling power, via a motor controller, linked to one or more motors;
one or more processors configured for controlling the various tools associated with locating, obtaining, and manipulating one or more target objects;
an autonomous coupling system associated with an autonomous charging system;

said one or more processors in communication with memory or Cloud network;

I/O devices which may include a sensor system, GPS, a built-in smartphone element;

a communication network utilizing BLUETOOTH, WIFI, Cloud networks, applications from the internet of things (IoT);

a control station remotely configured for managing mechanical operations and/or managing task objectives of said mobile robot, said drone device, said hybrid robot-drone via execution of one or more instructions;

an adaptive robot control system (ARCS) systematically configured for controlling the handling of a target object by various tools or appliances;

said sensor system utilizing sensors which may include LIDAR, RADAR, and cameras configured for obtaining target object data, accelerometers and sensors with respect to sensing a movement, a speed, or a charging process.

2. The robot and drone array of claim 1 in which said AI system further comprising:

one or more processors and motor controllers configured for controlling motion of one or more joint actuators, and motors of one or more drive wheels of a mobile robot, for controlling motion of one or more propellers, joint actuators, and motors of one or more drive wheels of a drone device, for controlling trajectory of said mobile robot, or for controlling trajectory of said drone device;

one or more sensors configured for obtaining information of an object within a spatial area of a mobile robot, of a drone device;

one or more processors configured for calibrating data received from the one or more sensors of said mobile robot or data received from the one or more sensors of said drone device;

one or more algorithms configured for navigating said mobile robot, drone device or hybrid robot-drone in respect to GPS providing placement via geographical interface, and mapping placement determined by said communication network, or navigating said drone device in respect to GPS placement determined by said control station.

3. The robot and drone array of claim 1 in which said mobile robot further comprising:

a body which may include one or more robotic arms and one or more robotic legs disposed on a fulcrum torso;

wherein said fulcrum torso comprising joint actuators, accelerometers, gyroscope;

wherein one or more processors configured for controlling bending movements such that the fulcrum torso joint keeps said mobile robot balanced;

wherein one or more processors configured for controlling maneuvers of said one or more robotic legs comprising a drive wheel arrangement is configured with trajectory algorithms calibrated for controlling steering motion or braking motion;

wherein one or more processors configured for controlling one or more robotic leg maneuvers such that the mobile robot may achieve maneuvers like squatting, walking, running, leaping, and other physical movements;

wherein one or more processors configured for controlling maneuvers of said one or more robotic arms, said one or more robotic arms may utilize, a gripper, a power tool, or a combination of thereof to manipulate a target object.

4. The robot and drone array of claim 1 in which said drone device further comprising:

one or more processors configured for controlling maneuvers of one or more robotic legs comprising a drive wheel arrangement is configured with trajectory algorithms calibrated for controlling steering motion or braking motion;

one or more processors configured for controlling maneuvers which may include lateral bending, pivoting, squatting, biped walking and/or skating motion;

one or more processors configured for controlling maneuvers of one or more robotic arms configured having joint actuators, a gripper, a power tool, or a combination of thereof to manipulate the handling of target objects;

one or more processors configured for controlling flying maneuvers of said drone device.

5. The robot and drone array of claim 1 in which said hybrid robot-drone further comprising:

a mobile robot and a drone device;

said mobile robot configured for supporting a payload and transporting a payload;

said mobile robot can dynamically transport said drone device during driving operation;

said drone device configured for supporting a heavy payload, such that said drone device can dynamically transport said mobile robot during flying operation;

said mobile robot and said drone device, when integrated, are capable of handling one or more task objectives as peers, such that both can assist one another to carry a payload, both can manipulate target objects via teamwork, both can become airborne;

said mobile robot and said drone device, when integrated, each are capable of handling one or more task objectives, such that each can carry a payload individually or each can manipulate target objects individually;

said mobile robot framework may include aquatic framework or aerospace framework;

said drone device framework may include aerial framework or aerospace framework;

a control station remotely configured for managing mechanical operations and/or managing task objectives of said mobile robot and/or said drone device via execution of one or more navigation instructions.

6. The robot and drone array of claim 1 in which said drone device further comprising:

framework which may include one or more foldable landing gear comprising actuators and may include a footing arrangement, or a drive wheel arrangement to support said drone device during moving on land.

7. The robot and drone array of claim 1 in which said one or more drive wheel arrangements further comprising:

framework which may include at least one drive wheel configured having an electric motor mounted therein, or at least one track wheel configured having an electric motor mounted therein;

an AI system, said AI system associated with one or more processors configured to control a steering maneuver of said one or more drive wheel arrangements;

said AI system associated with one or more processors configured for controlling power to said electric motor;

a sensor system utilizing accelerometers and motor sensor with respect to sensing a movement, a speed of said at least one drive wheel.

8. The robot and drone array of claim 1 in which said autonomous coupling system further comprising:

one or more processors configured for activating one or more locking mechanisms, when activated, said one or more locking mechanisms engage a connection between said mobile robot and said drone device;

one or more processors configured for deactivating one or more locking mechanisms, when deactivated, said one or more locking mechanisms disengage the connection between said mobile robot and said drone device;

one or more processors configured to activate an autonomous charging system associated with charging said drone device during coupling process.

9. A robot and drone array comprising framework which may include:
- an articulated head configured for user interface;
- a control panel configured for user interface;
- a built-in smartphone element;
- a LED lighting system configured with computer-generated LED lighting effects;
- a large compartment for containing a payload or an appliance which may include a microwave for cooking, a mini-oven for heating items, a mini refrigerator for cooling and freezing items, a vending machine, a mini washing machine for cleaning and drying items, a mini-lab for scientific applications, or service appliances;
- a landing platform configured with one or more locking mechanisms to couple said drone device to a mobile robot or vice versa;
- an autonomous coupling system associated with one or more processors for connecting or disconnecting said drone device to/from a mobile robot via said one or more locking mechanisms;
- one or more foldable landing gear comprising actuators and may include a footing arrangement, or a drive wheel to support said drone device during moving on land, or a floatation buoy for landing on water, or said actuators allowing said footing arrangement, or said drive wheel arrangement to be stowed;
- a sensor system utilizing accelerometers and motor sensors with respect to sensing a movement, a speed, or to a navigating process;
- I/O devices associated with wireless communication;
- various object detecting sensors disposed therein;
- framework which may include aquatic framework components, aerial framework components or aerospace framework components.

10. A robot and drone array comprising:
- a mobile robot and/or a drone device configured for attaining a payload, handling a payload, transporting a payload;
- said mobile robot configured for dynamically transporting said drone device such that said mobile robot carries said drone device during a driving operation;
- said drone device configured for dynamically supporting a heavy payload, such that said drone device can dynamically carry said mobile robot and/or transport said mobile robot during a flying operation;
- a control station remotely configured for managing mechanical operations of said robot and drone array via execution of one or more instructions, respectively execution of one or more instructions;
- said one or more navigating instructions may include to cause said mobile robot to activate one or more locking mechanisms, when activated, said one or more locking mechanisms engage a connection between said mobile robot and said drone device, when deactivated, said one or more locking mechanisms disengage the connection between said mobile robot and said drone device;
- said one or more navigating instructions may include to cause said mobile robot to activate an autonomous charging system associated with charging said drone device during coupling process;
- one or more navigating instructions may include to cause said mobile robot to activate a drive wheel, to regulate power to a motor of a drive wheel such that velocity is controlled, to control steering of said drive wheel, such that said mobile robot navigates to specific GPS location, such that said mobile robot to attain a payload, such that said mobile robot to handle a payload, such that said mobile robot to transport a payload;
- wherein one or more navigating instructions may include to cause said drone device to activate a drive wheel, to regulate power to a motor of a drive wheel such that velocity is controlled, to control steering of said drive wheel, such that said drone device navigates to specific GPS location, such that said drone device to attain a payload, such that said drone device to handle a payload, such that said drone device to transport a payload during ground contact;
- wherein one or more navigating instructions which may include to cause said drone device to engage a landing gear of said drone device, when engage, to terminate said hover mode, and thus, to activate a drive wheel which is disposed on said landing gear, and thusly to control steering and velocity of said drive wheel in order to drive said drone device to a predetermined destination during ground contact;
- wherein one or more flight plan navigating instructions which may include to cause said drone device to calibrate GPS causing said drone device to fly to a specific location, causing said drone device to enter a hover mode thus to hover in various flight positions, in such a manner that said drone device to attain a payload, such that said drone device to handle a payload, such that said drone device to transport a payload during aerial operation.

* * * * *